US012213126B2

(12) United States Patent
Ryu et al.

(10) Patent No.: US 12,213,126 B2
(45) Date of Patent: *Jan. 28, 2025

(54) SIDELINK GROUPCAST REACHABILITY BASED SCHEDULING

(71) Applicant: QUALCOMM Incorporated, San Diego, CA (US)

(72) Inventors: Jung Ho Ryu, Fort Lee, NJ (US); Sony Akkarakaran, Poway, CA (US); Kapil Gulati, Belle Mead, NJ (US); Juan Montojo, San Diego, CA (US); Junyi Li, Fairless Hills, PA (US); Mahmoud Taherzadeh Boroujeni, San Diego, CA (US); Tao Luo, San Diego, CA (US); Hong Cheng, Basking Ridge, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/046,445

(22) Filed: Oct. 13, 2022

(65) Prior Publication Data

US 2023/0055878 A1 Feb. 23, 2023

Related U.S. Application Data

(63) Continuation of application No. 17/072,022, filed on Oct. 15, 2020, now Pat. No. 11,653,349.

(Continued)

(51) Int. Cl.
*H04W 72/04* (2023.01)
*H04W 16/28* (2009.01)
(Continued)

(52) U.S. Cl.
CPC ......... *H04W 72/121* (2013.01); *H04W 16/28* (2013.01); *H04W 72/0446* (2013.01);
(Continued)

(58) Field of Classification Search
CPC ............... H04W 76/27; H04W 72/121; H04W 72/1263; H04W 72/0446; H04W 72/04;
(Continued)

(56) References Cited

U.S. PATENT DOCUMENTS 9,572,063 B2  2/2017  Etemad et al.
10,194,442 B2  1/2019  Nagaraja et al.
(Continued)

FOREIGN PATENT DOCUMENTS

CN  107466068 A  12/2017
WO  2016163972 A1  10/2016
(Continued)

OTHER PUBLICATIONS

Huawei, et al., "Sidelink Physical Layer Procedures for NR V2X", 3GPP TSG RAN WG1 Meeting #96, 3GPP Draft; R1-1901537, 3rd Generation Partnership Project (3GPP), Mobile Competence Centre; 650, Route Des Lucioles; F-06921 Sophia-Antipolis Cedex; France, Mar. 1, 2019 (Mar. 1, 2019), pp. 1-16, XP051599234, Retrieved from the Internet: URL: http://www.3gpp.orgjftpjtsg%5Fran/WG1%5FRL1/TSGR1%5F96/Docs/R1%2D1901537%2Ezip pp. 1-13.
(Continued)

*Primary Examiner* — Wei Zhao
(74) *Attorney, Agent, or Firm* — Holland & Hart LLP/QUALCOMM Incorporated

(57) ABSTRACT

Methods, systems, and devices for wireless communications are described in which a user equipment (UE) of a group of UEs may communicate with other members of the group to provide data or other information via sidelinks. The UE may transmit a groupcast sidelink request to the base station. After receiving the sidelink request, the base station may send a sidelink grant (e.g., transmit or receive grant) in downlink control information (DCI) to the UEs in the
(Continued)

sidelink groupcast communications group. The sidelink grant may include information for each hop such as which UEs are going to transmit or receive, the reception or transmission beams of the UEs, time and frequency resources, or the data to forward or relay. In some examples, a UE may relay information to other UEs in the sidelink groupcast communications group.

42 Claims, 17 Drawing Sheets

Related U.S. Application Data

(60) Provisional application No. 62/925,687, filed on Oct. 24, 2019.

(51) Int. Cl.
| | | |
|---|---|---|
| *H04W 72/0446* | (2023.01) | |
| *H04W 72/121* | (2023.01) | |
| *H04W 72/1263* | (2023.01) | |
| *H04W 72/23* | (2023.01) | |
| *H04W 76/27* | (2018.01) | |
| *H04W 80/02* | (2009.01) | |
| *H04W 92/18* | (2009.01) | |

(52) U.S. Cl.
CPC ....... *H04W 72/1263* (2013.01); *H04W 72/23* (2023.01); *H04W 76/27* (2018.02); *H04W 80/02* (2013.01); *H04W 92/18* (2013.01)

(58) Field of Classification Search
CPC ..... H04W 72/14; H04W 16/28; H04W 80/02; H04W 92/18
See application file for complete search history.

(56) References Cited

U.S. PATENT DOCUMENTS

| | | | |
|---|---|---|---|
| 11,452,101 B2 | 9/2022 | Akkarakaran et al. | |
| 11,653,349 B2 | 5/2023 | Ryu et al. | |
| 2009/0180451 A1* | 7/2009 | Alpert ............... | H04W 72/1215 370/338 |
| 2010/0214169 A1 | 8/2010 | Kafle | |
| 2011/0244800 A1 | 10/2011 | Bogestam et al. | |
| 2012/0120892 A1 | 5/2012 | Freda et al. | |
| 2013/0294318 A1 | 11/2013 | Amerga et al. | |
| 2015/0011230 A1 | 1/2015 | Noh et al. | |
| 2016/0338095 A1 | 11/2016 | Faurie et al. | |
| 2017/0171837 A1 | 6/2017 | Chen et al. | |
| 2018/0035448 A1 | 2/2018 | Gupta et al. | |
| 2018/0049219 A1* | 2/2018 | Gupta ................. | H04W 72/563 |
| 2018/0091262 A1 | 3/2018 | Jung et al. | |
| 2018/0139724 A1 | 5/2018 | Loehr et al. | |
| 2018/0206257 A1 | 7/2018 | Lee et al. | |
| 2018/0249453 A1 | 8/2018 | Nagaraja et al. | |
| 2019/0045569 A1 | 2/2019 | Abedini et al. | |
| 2019/0159188 A1 | 5/2019 | Sadiq et al. | |
| 2019/0174346 A1 | 6/2019 | Murray et al. | |
| 2019/0261234 A1 | 8/2019 | Park et al. | |
| 2019/0268918 A1 | 8/2019 | Baghel et al. | |
| 2019/0372647 A1 | 12/2019 | Su et al. | |
| 2020/0022089 A1 | 1/2020 | Guo | |
| 2020/0092685 A1* | 3/2020 | Fehrenbach ........ | H04W 84/047 |
| 2020/0119895 A1 | 4/2020 | Choi et al. | |
| 2020/0178221 A1 | 6/2020 | Byun et al. | |
| 2020/0187236 A1 | 6/2020 | Moon et al. | |
| 2021/0127381 A1 | 4/2021 | Ryu et al. | |
| 2021/0127403 A1 | 4/2021 | Ryu et al. | |
| 2021/0127404 A1 | 4/2021 | Ryu et al. | |
| 2021/0168574 A1 | 6/2021 | Zhang et al. | |
| 2021/0175943 A1 | 6/2021 | Xu et al. | |
| 2021/0219268 A1 | 7/2021 | Li et al. | |
| 2021/0274545 A1 | 9/2021 | Adjakple et al. | |
| 2021/0344407 A1 | 11/2021 | Hunag et al. | |
| 2021/0345396 A1 | 11/2021 | Yu et al. | |
| 2022/0007403 A1 | 1/2022 | Li et al. | |
| 2022/0132603 A1 | 4/2022 | Adjakple et al. | |

FOREIGN PATENT DOCUMENTS

| | | | |
|---|---|---|---|
| WO | WO2017111883 A1 | 6/2017 | |
| WO | WO-2018024080 A1 | 2/2018 | |
| WO | 2018148552 | 8/2018 | |
| WO | WO2019009454 A1 | 1/2019 | |
| WO | WO-2019036578 A1 | 2/2019 | |
| WO | 2019161132 | 8/2019 | |
| WO | WO2019160973 A1 | 8/2019 | |
| WO | WO2019187423 A1 | 10/2019 | |
| WO | WO2021062400 A1 | 4/2021 | |

OTHER PUBLICATIONS

Huawei, et al., "Sidelink Resource Allocation Mechanism for NR V2X", 3GPP TSG RAN WG1 Meeting #94bis, 3GPP Draft; R1-1811904 Updated V1 Clean, 3rd Generation Partnership Project (3GPP), Mobile Competence Centre; 650, Route Des Lucioles; F-06921 Sophia-Antipolis Cedex; France vol. RAN WG1, No. Chengdu, China; Oct. 8, 2018-Oct. 12, 2018, Oct. 10, 2018 (Oct. 10, 2018), 13 Pages, XP051519227.
International Search Report and Written Opinion—PCT/US2020/056006—ISA/EPO—dated Dec. 16, 2020.
VIVO: "Enhancements of Uu Link to Control Sidelink", 3GPP Draft, 3GPP TSG RAN WG1 Meeting #95, R1-1812310, Enhancements of Uu Link to Control Sidelink, 3rd Generation Partnership Project (3GPP), Mobile Competence Centre, 650, Route Des Lucioles, F-06921, Sophia-Antipolis Cedex, France, vol. RAN WG1, No. Spokane, USA, Nov. 12, 2018- Nov. 16, 2018, Nov. 3, 2018 (Nov. 3, 2018), XP051478499, 5 pages, Section 2, Section 4, figures 1. 2, 3.
ZTE: "Initial Consideration on NR V2X Resource Allocation", 3GPP Draft, 3GPP TSG-RAN WG2#103bis, R2-1814168, Initial Consideration on NR V2X Resource Allocation, 3rd Generation Partnership Project (3GPP), Mobile Competence Centre, 650, Route Des Lucioles, F-06921, Sophia-Antipolis Cedex, vol. RAN WG2, Sep. 28, 2018 (Sep. 28, 2018), 7 pages, XP051523625, Sections 1-3.
Interdigital Inc: "NR Sidelink Resource Allocation for Mode 1", 3GPP TSG RAN WG1 #96bis, R1-1905401, Xi'an, China, Apr. 8, 2019-Apr. 12, 2019, 4 Pages.
ZTE: "Mode 1 Resource Allocation Schemes on Sidelink", 3GPP TSG RAN WG1 #97, R1-1907129, Reno, Nevada, US, May 13, 2019-May 17, 2019, pp. 1-4.

* cited by examiner

US 12,213,126 B2

SIDELINK GROUPCAST REACHABILITY BASED SCHEDULING

CROSS REFERENCE

The present Application for Patent is a Continuation of U.S. patent application Ser. No. 17/072,022 by RYU et al., entitled "SIDELINK GROUPCAST REACHABILITY BASED SCHEDULING," filed Oct. 15, 2020, which claims the benefit of U.S. Provisional Patent Application No. 62/925,687 by RYU et al., entitled "SIDELINK GROUPCAST REACHABILITY BASED SCHEDULING," filed Oct. 24, 2019, each of which assigned to the assignee hereof, and expressly incorporated by reference in its entirety herein.

INTRODUCTION

The following relates generally to wireless communications and more specifically to managing sidelink based communications.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

A UE may communicate with a base station or other UEs using beamforming techniques. A UE may have multiple panels (e.g., antenna modules, antenna arrays) which are used to form a communication beam (e.g., a reception beam or transmission beam) to communicate with base stations or other UEs. In some cases, the reception beams and the transmission beams of the communicating devices may not align or may interfere with each other (e.g., between different devices), which may result in a communication failure.

SUMMARY

A method of wireless communications at a base station is described. The method may include receiving, from a first user equipment (UE) of a group of UEs supported by the base station, a sidelink scheduling request for groupcast communications between the first UE and the group of UEs, determining, based on a beam training report associated with a beam training procedure between the first UE and one or more other UEs of the group of UEs, first time resources for transmission of a groupcast sidelink message from the first UE to a second UE of the group of UEs and second time resources for transmission of the groupcast sidelink message from the second UE to a third UE of the group of UEs, and transmitting a groupcast sidelink grant indicating the first and second time resources.

An apparatus for wireless communications at a base station is described. The apparatus may include a processor, memory coupled to the processor, the processor and memory configured to receive, from a first UE of a group of UEs supported by the base station, a sidelink scheduling request for groupcast communications between the first UE and the group of UEs, determine, based on a beam training report associated with a beam training procedure between the first UE and one or more other UEs of the group of UEs, first time resources for transmission of a groupcast sidelink message from the first UE to a second UE of the group of UEs and second time resources for transmission of the groupcast sidelink message from the second UE to a third UE of the group of UEs, and transmit a groupcast sidelink grant indicating the first and second time resources.

Another apparatus for wireless communications at a base station is described. The apparatus may include means for receiving, from a first UE of a group of UEs supported by the base station, a sidelink scheduling request for groupcast communications between the first UE and the group of UEs, determining, based on a beam training report associated with a beam training procedure between the first UE and one or more other UEs of the group of UEs, first time resources for transmission of a groupcast sidelink message from the first UE to a second UE of the group of UEs and second time resources for transmission of the groupcast sidelink message from the second UE to a third UE of the group of UEs, and transmitting a groupcast sidelink grant indicating the first and second time resources.

A non-transitory computer-readable medium storing code for wireless communications at a base station is described. The code may include instructions executable by a processor to receive, from a first UE of a group of UEs supported by the base station, a sidelink scheduling request for groupcast communications between the first UE and the group of UEs, determine, based on a beam training report associated with a beam training procedure between the first UE and one or more other UEs of the group of UEs, first time resources for transmission of a groupcast sidelink message from the first UE to a second UE of the group of UEs and second time resources for transmission of the groupcast sidelink message from the second UE to a third UE of the group of UEs, and transmit a groupcast sidelink grant indicating the first and second time resources.

Some examples of the method, apparatuses, and non-transitory computer-readable medium described herein may further include operations, features, means, or instructions for receiving the beam training report from the first UE, receiving a second beam training report from the second UE, the second beam training report associated with a second beam training procedure between the second UE and at least one other UE, and determining the first and second time resources based on the second beam training report.

In some examples of the method, apparatuses, and non-transitory computer-readable medium described herein, the at least one other UE includes the first UE, the second UE, or another UE.

Some examples of the method, apparatuses, and non-transitory computer-readable medium described herein may further include operations, features, means, or instructions for generating a connectivity map associated with the group of UEs based on the beam training report, where the connectivity map indicates link quality between two or more UEs of the group of UEs, and determining the first and second time resources based on the connectivity map.

In some examples of the method, apparatuses, and non-transitory computer-readable medium described herein, the connectivity map indicates transmit beam and receive beam link quality between the two or more UEs.

In some examples of the method, apparatuses, and non-transitory computer-readable medium described herein, the first time resources may be associated with a first hop of a multi-hop transmission of the groupcast sidelink message, and the second time resources may be associated with a second hop of the multi-hop transmission of the groupcast sidelink message.

Some examples of the method, apparatuses, and non-transitory computer-readable medium described herein may further include operations, features, means, or instructions for determining a first transmit beam for the first UE to use for transmission of the groupcast sidelink message to the second UE based on the beam training report, and determining a second transmit beam for the second UE to use for transmission of the groupcast sidelink message to the third UE based on the beam training report.

Some examples of the method, apparatuses, and non-transitory computer-readable medium described herein may further include operations, features, means, or instructions for determining a first receive beam for the second UE to use for reception of the groupcast sidelink message from the first UE based on the beam training report, and determining a second receive beam for the third UE to use for reception of the groupcast sidelink message from the second UE based on the beam training report.

In some examples of the method, apparatuses, and non-transitory computer-readable medium described herein, the first transmit and receive beams may be specific to a first hop of a multi-hop transmission of the groupcast sidelink message, and the second transmit and receive beams may be specific to a second hop of the multi-hop transmission of the groupcast sidelink message.

Some examples of the method, apparatuses, and non-transitory computer-readable medium described herein may further include operations, features, means, or instructions for transmitting the groupcast sidelink grant to the first UE, the second UE, at least one other UE, or any combination thereof.

In some examples of the method, apparatuses, and non-transitory computer-readable medium described herein, the groupcast sidelink grant may be transmitted via radio resource control (RRC) signaling, a medium access control (MAC) control element (MAC-CE), a downlink control information (DCI) transmission, or any combination thereof.

In some examples of the method, apparatuses, and non-transitory computer-readable medium described herein, the sidelink scheduling request includes a group identifier associated with the group of UEs, an identifier of the first UE, one or more transmission beams for the groupcast sidelink message, respective identifiers for each UE of the group of UEs, an amount of data corresponding to the groupcast sidelink message, or any combination thereof.

A method of wireless communications at a second UE is described. The method may include transmitting a beam training report to a base station based on a beam training procedure between two or more UEs of a group of UEs supported by the base station, receiving, from the base station, a groupcast sidelink grant based on the beam training report, the groupcast sidelink grant indicating first time resources for transmission of a groupcast sidelink message from a first UE to the second UE and second time resources for transmission of the groupcast sidelink message from the second UE to a third UE, receiving the groupcast sidelink message from the first UE via the first time resources, and transmitting the groupcast sidelink message received from the first UE to the third UE via the second time resources.

An apparatus for wireless communications at a second UE is described. The apparatus may include a processor, memory coupled to the processor, the processor and memory configured to transmit a beam training report to a base station based on a beam training procedure between two or more UEs of a group of UEs supported by the base station, receive, from the base station, a groupcast sidelink grant based on the beam training report, the groupcast sidelink grant indicating first time resources for transmission of a groupcast sidelink message from a first UE to the second UE and second time resources for transmission of the groupcast sidelink message from the second UE to a third UE, receive the groupcast sidelink message from the first UE via the first time resources, and transmit the groupcast sidelink message received from the first UE to the third UE via the second time resources.

Another apparatus for wireless communications at a second UE is described. The apparatus may include means for transmitting a beam training report to a base station based on a beam training procedure between two or more UEs of a group of UEs supported by the base station, receiving, from the base station, a groupcast sidelink grant based on the beam training report, the groupcast sidelink grant indicating first time resources for transmission of a groupcast sidelink message from a first UE to the second UE and second time resources for transmission of the groupcast sidelink message from the second UE to a third UE, receiving the groupcast sidelink message from the first UE via the first time resources, and transmitting the groupcast sidelink message received from the first UE to the third UE via the second time resources.

A non-transitory computer-readable medium storing code for wireless communications at a second UE is described. The code may include instructions executable by a processor to transmit a beam training report to a base station based on a beam training procedure between two or more UEs of a group of UEs supported by the base station, receive, from the base station, a groupcast sidelink grant based on the beam training report, the groupcast sidelink grant indicating first time resources for transmission of a groupcast sidelink message from a first UE to the second UE and second time resources for transmission of the groupcast sidelink message from the second UE to a third UE, receive the groupcast sidelink message from the first UE via the first time resources, and transmit the groupcast sidelink message received from the first UE to the third UE via the second time resources.

Some examples of the method, apparatuses, and non-transitory computer-readable medium described herein may further include operations, features, means, or instructions for determining a receive beam for reception of the groupcast sidelink message from the first UE based on the groupcast sidelink grant, and monitoring the first time resources for the groupcast sidelink message using the receive beam.

Some examples of the method, apparatuses, and non-transitory computer-readable medium described herein may further include operations, features, means, or instructions for determining a transmit beam for transmission of the groupcast sidelink message to the third UE based on the groupcast sidelink grant, and transmitting, via the second time resources, the groupcast sidelink message using the transmit beam.

Some examples of the method, apparatuses, and non-transitory computer-readable medium described herein may further include operations, features, means, or instructions for receiving the groupcast sidelink grant via RRC signaling, a MAC-CE, a DCI transmission, or any combination thereof.

In some examples of the method, apparatuses, and non-transitory computer-readable medium described herein, the groupcast sidelink grant indicates a relay identifier of the second UE, respective receive identifiers for one or more receive UEs including the third UE, a hop number or identifier for transmission of the groupcast sidelink message by the second UE, a transmission beam for transmission of the groupcast sidelink message by the first UE or the second UE, or any combination thereof.

In some examples of the method, apparatuses, and non-transitory computer-readable medium described herein, the beam training report indicates one or more of a resource in which a training signal was transmitted, identifications of one or more training beams, a received signal quality of a training signal received at the second UE, beams used at the second UE to receive the training signal, a resource in which the training signal was received, or any combination thereof.

In some examples of the method, apparatuses, and non-transitory computer-readable medium described herein, the beam training report indicates a subset of UEs including the third UE that may be reachable by the second UE.

DETAILED DESCRIPTION

Figure 1:
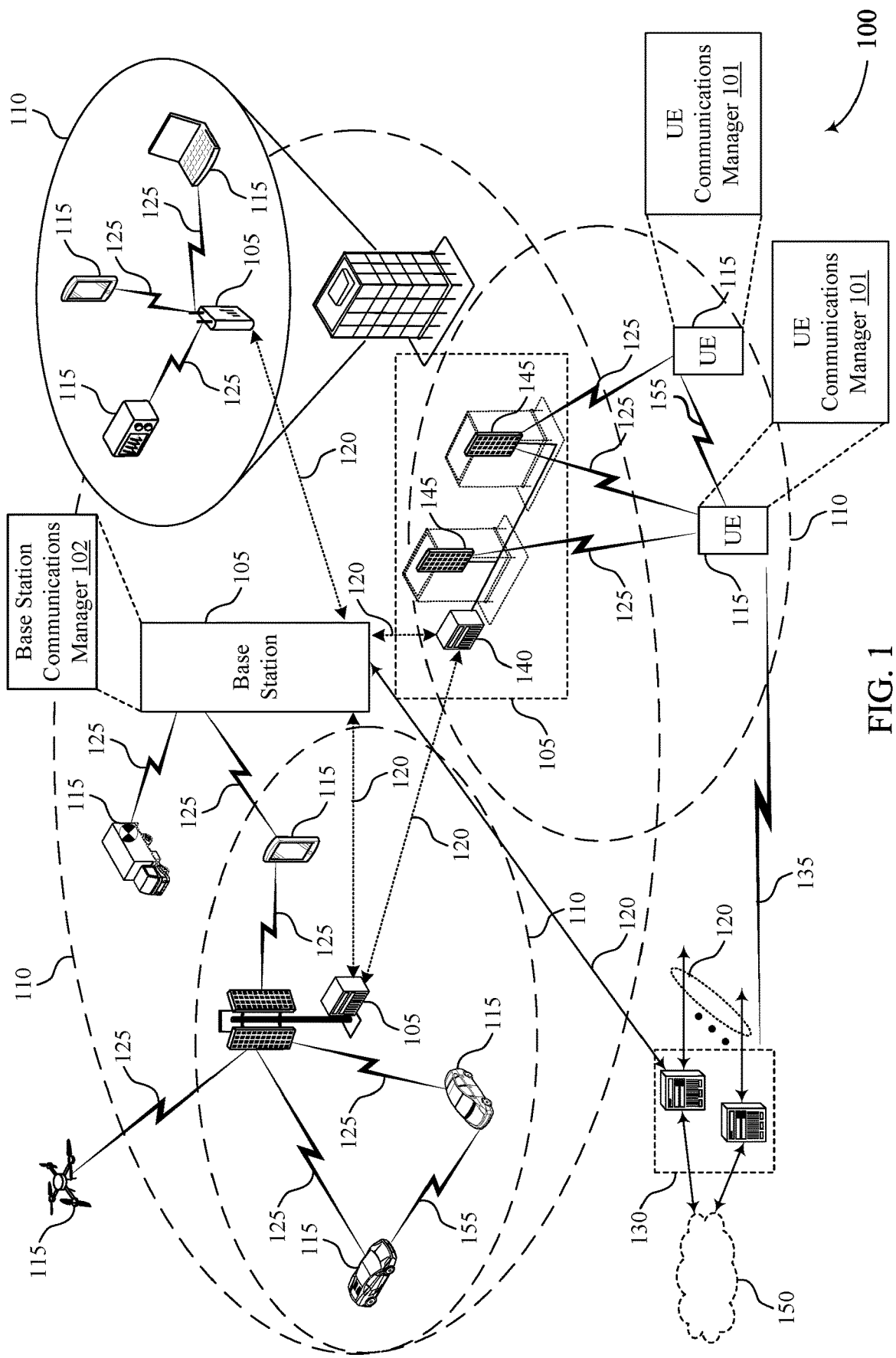
FIG. 1 illustrates an example of a wireless communications system that supports sidelink groupcast reachability based scheduling in accordance with one or more aspects of the present disclosure.

A wireless communications system may support both access links and sidelinks for communications between wireless devices. An access link may refer to a communication link between a UE and a base station. For example, an access link may support uplink signaling, downlink signaling, connection procedures, etc. A sidelink may refer to any communication link between similar wireless devices (e.g., a communication link between UEs or a backhaul communication link between base stations). It is noted that while various examples provided herein are discussed for UE sidelink devices, such sidelink techniques may be used for any type of wireless devices that use sidelink communications. For example, a sidelink may support device-to-device (D2D) communications, vehicle-to-everything (V2X) or vehicle-to-vehicle (V2V) communications, message relaying, discovery signaling, beacon signaling, or any combination of these or other signals transmitted over-the-air from one wireless device to one or more other wireless devices.

As demand for sidelink communication increases, (e.g., due to increased V2X demand for autonomous and semi-autonomous vehicles, D2D communication between Internet-of-Things (IoT) devices, or factory automation), techniques to efficiently and reliably enhance throughput and reliability of sidelink channels is desirable. In some cases, sidelink groupcast communications may be desired, in which one transmitting device may transmit signals to multiple other devices (e.g., a vehicle that transmits sensor data to multiple other vehicles via sidelink communications). Techniques such as discussed in various aspects of the present disclosure provide for sidelink groupcast communications in which directional transmission/reception beams used for wireless communications between devices of a group of sidelink devices may be identified. Beam identification may be determined based on one or more measurements made by sidelink devices of training beams transmitted by another sidelink device.

In some cases, a first UE may be a transmitting UE that is to transmit groupcast sidelink communications to multiple other UEs of a group of UEs. Further, the sidelink communications may utilize directional beamforming in which directional beams may be used for communications. In order to determine a preferred directional beam, the UEs of the group may perform a beam training procedure in which the first UE transmits a series of transmissions using a series of different beams, and the multiple other UEs may measure received signal characteristics of the series of different beams to identify one or more preferred beams. A UE may communicate with a base station or other UEs using beam-forming techniques. A UE may have multiple panels (e.g., antenna modules or antenna arrays) which are each able to form a communication beam (e.g., a reception beam or transmission beam) to communicate with base stations over an access link or communicate with other UEs or integrated Access and Backhaul (IAB) nodes over sidelinks. A UE may communicate with the group of UEs using groupcast or multicast communication techniques on a sidelink. In some cases, the reception beams of a UE may not align with the transmission beams of another UE on a sidelink.

A transmit UE may send a beam training report to the base station based on the results of the beam training procedure. The beam training report may indicate the received signal quality of the beam training signal, the reception beams used by the group of UEs, the available time and frequency resources, the interference the UE detected while using reception and transmit beams, link quality between the group of UEs, or UEs with reception beams which the transmit UE may or may not be able reach with its transmission beams.

The transmit UE may transmit a groupcast sidelink request to the base station. The groupcast sidelink request may include an identifier (ID) of the UE, the transmission beams of the UE, the reception beams of the receiving UEs which are members of a sidelink groupcast communications group, or the amount of data the UE is going to transmit. After receiving the sidelink request, the base station may send a groupcast sidelink grant (e.g., transmit or receive grant) in a DCI to the UEs of the sidelink groupcast communications group. The sidelink grant may include information for each hop such as which UEs are going to transmit or receive, which reception or transmission beams to use, available resources, or data to relay. In some examples, a UE may relay information (e.g., groupcast sidelink message) to UEs in the sidelink groupcast communications group.

Particular aspects of the subject matter described herein may be implemented to realize one or more advantages. The described techniques may support improvements in communications using reception and transmission beams, decreasing signaling overhead, and improving reliability, among other advantages. As such, supported techniques may include improved network operations and, in some examples, may promote network efficiencies, among other benefits.

Aspects of the disclosure are initially described in the context of wireless communications systems. Aspects are then described with respect to a process flow. Aspects of the disclosure are further illustrated by and described with reference to apparatus diagrams, system diagrams, and flowcharts that relate to sidelink groupcast reachability based scheduling.

FIG. 1 illustrates an example of a wireless communications system 100 that supports sidelink groupcast reachability based scheduling in accordance with one or more aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples, the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as OFDM or DFT-S-OFDM). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a D2D communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using V2X communications, V2V communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A MAC layer may perform priority handling and multiplexing of logical channels into transport channels. The MAC layer may also use error detection techniques, error correction techniques, or both to support retransmissions at the MAC layer to improve link efficiency. In the control plane, the RRC protocol layer may provide establishment, configuration, and maintenance of an RRC connection between a UE 115 and a base station 105 or a core network 130 supporting radio bearers for user plane data. At the physical layer, transport channels may be mapped to physical channels.

A UE 115 may include a communications manager 101, which may be used to perform a beam training procedure with a group of UEs 115 supported by a base station 105. The communications manager 101 may send a beam training report to the base station based on the results of the beam training procedure. The beam training report may indicate the received signal quality of the beam training signal, the reception beams and transmission beams used by the group of UEs 115, the time and frequency resources in which the beam training signal was transmitted and received, and UEs 115 with reachable reception beams.

The UE 115 and the group of UEs 115 may be members of a sidelink groupcast communications group, in which members of the group may communicate with other members of the group to provide data or other information via sidelinks. The communications manager 101 may transmit a groupcast sidelink request to the base station 105. The groupcast sidelink request may include an identifier (ID) of the UE 115, the transmission beams of the UE 115, the reception beams of the receiving UEs 115, or the amount of data the UE 115 is going to transmit. The base station 105 may include a communications manager 102. After receiving the sidelink request, the communications manager 102 of the base station 105 may send a sidelink grant (e.g., transmit or receive grant) in DCI to the UEs 115 in the sidelink groupcast communications group. The sidelink grant may include information for each hop such as which UEs 115 are going to transmit or receive, the reception or transmission beams of the UEs 115, time and frequency resources, or the data to forward or relay. In some examples, a UE 115 may relay information to other UEs 115 in the sidelink groupcast communications group.

In some examples, the communications manager 102 of base station 105 may receive a sidelink scheduling request for groupcast communications from a UE 115 of a group of UEs 115 supported by base station 105. Base station 105 may determine time and frequency resources for transmission of a groupcast sidelink message from the UE 115 to a relay UE 115 of the group of UEs 115. The communications manager 102 of base station 105 may transmit a groupcast sidelink grant indicating time and frequency resources to the group of UEs 115.

Figure 2:
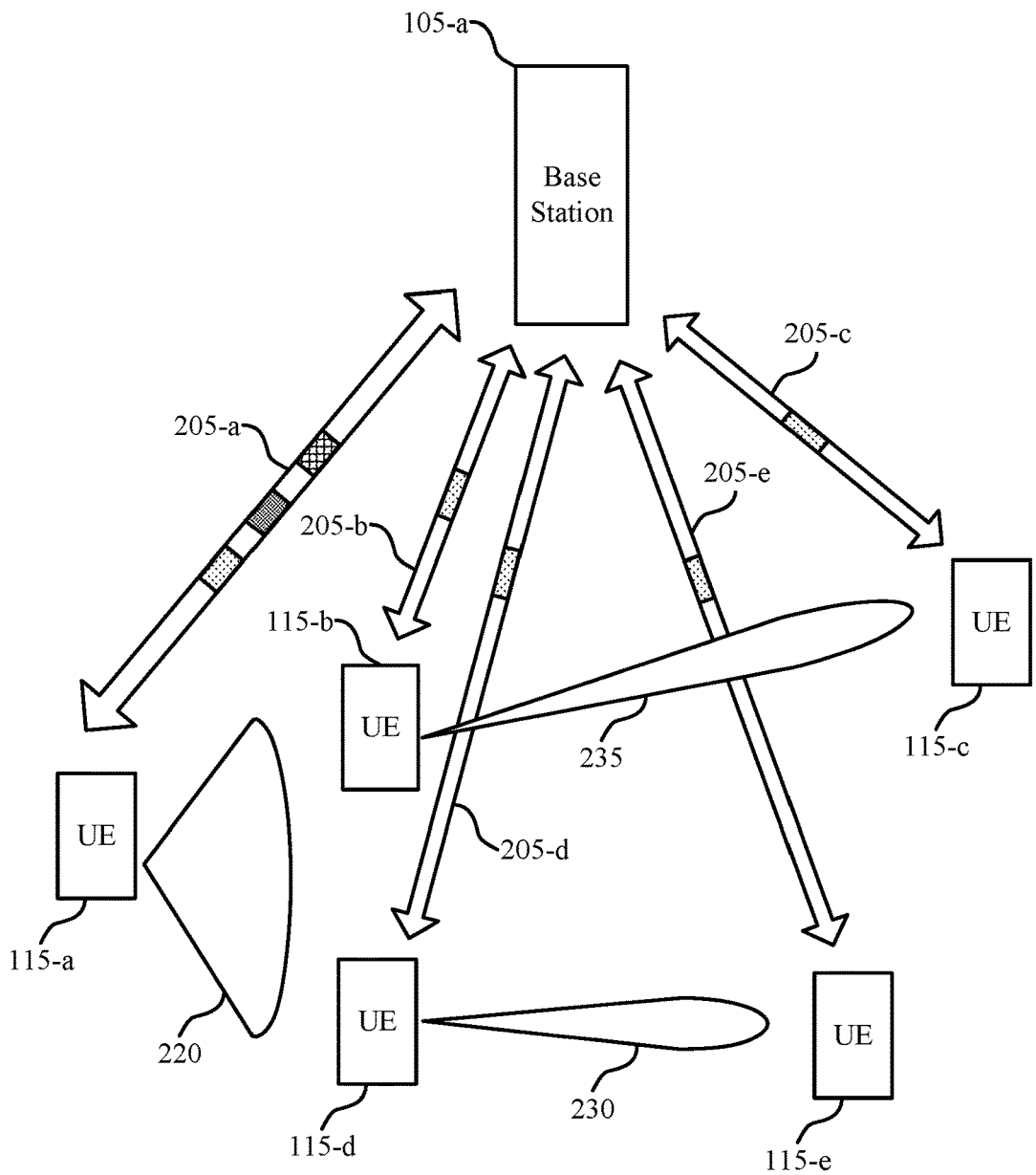
FIG. 2 illustrates an example of a wireless communications system that supports sidelink groupcast reachability based scheduling in accordance with one or more aspects of the present disclosure.

FIG. 2 illustrates an example of a wireless communications system 200 that supports sidelink groupcast reachability based scheduling in accordance with one or more aspects of the present disclosure. In some examples, wireless communications system 200 may implement aspects of wireless communications system 100. In some examples, the wireless communications system 200 may include a UE 115-a, a UE 115-b, a UE 115-c, a UE 115-d, a UE 115-e, and base station 105-a which may be examples of UEs 115 and base stations 105 described with reference to FIG. 1. One or more of the UEs 115 may communicate with the base station 105-a using a corresponding access link 205. In this example, the base station 105-a may communicate with UE 115-a via access link 205-a, may communicate with UE 115-b via access link 205-b, may communicate with UE 115-c via access link 205-c, may communicate with UE 115-d via access link 205-d, and may communicate with UE 115-e via access link 205-e.

In this example, UE 115-a, UE 115-b, UE 115-c, UE 115-d, and UE 115-e may be members of a sidelink groupcast communications group, in which members of the group may communicate with other members of the group to provide data or other information via sidelinks. In some cases, an applications layer at the first UE 115-a may prompt the creation of the sidelink groupcast communications group, and the group may be established through communications with the applications layer of other UEs 115 in the group. It is noted that the illustrated sidelink groupcast communications group provide communications between five UEs 115, which are illustrated in wireless communications system 200 for the sake of brevity, and the techniques described herein may be applicable to other numbers of UEs 115 within a system that may establish a groupcast communications group. Further, sidelink communication techniques may be used for device-to-device communication of wireless devices other than UEs, such as base station communications (e.g., wireless backhaul links between base stations or transmit-receive points (TRPs)), communications between access points, and the like.

In some cases, a group of UEs 115 may form the sidelink groupcast communications group, and negotiation may happen between UE 115 members of the group. UE 115-a (or UE 115-b, UE 115-c, UE 115-d, UE 115-e) may send a beam training report 225 to base station 105-a. Base station 105-a may determine, based on the beam training report 225, transmission beam 220 for UE 115-a to use for transmission of a groupcast sidelink message to UE 115-b and UE 115-d. Additionally, base station 105-a may determine transmit beams 230 and 235 for UE 115-b and UE 115-d to use for transmission of the groupcast sidelink message to UE 115-c and UE 115-e. Base station 105-a may determine, based on the beam training report 225, receive beams for UE 115-b, UE 115-c, UE 115-d, and UE 115-e to use for reception of the groupcast sidelink message.

In some examples, base station 105-a may generate, based on the beam training report 225, a connectivity map of the UEs 115 indicating the link quality (e.g., interference) between UEs 115 in the sidelink groupcast communications group or the transmit and receive beams between the UEs 115. Base station 105-a may determine the time and frequency resources the UEs 115 may use based on the connectivity map.

The beam training report 225 may identify UEs 115 with reachable reception beams. For example, UE 115-a may be able to directly reach the reception beams of UE 115-b and UE 115-d with a transmit beam 220 but may be unable to directly reach the reception beams of UE 115-c and UE 115-e (e.g., UE 115-c and UE 115-e moved out of the direct reach of the transmission beam of UE 115-a). UE 115-a may communicate with UE 115-c and UE 115-e in the sidelink groupcast communications group with multi-hop communications such as UE 115-b and UE 115-d relaying the communication information to UE 115-c and UE 115-e. For example, in a first hop UE 115-a may send data (e.g., groupcast sidelink message) on the transmit beam 220 (e.g., wide beam) to UE 115-b and UE 115-d. In a second hop UE 115-b may relay the groupcast sidelink message over a sidelink to UE 115-c with transmit beam 235 (e.g., narrow beam) and UE 115-d may relay the groupcast sidelink message over a sidelink to UE 115-e with transmit beam 230 (e.g., narrow beam). If two sidelink communications, such as the sidelink between UE 115-b and UE 115-c and the sidelink between UE 115-d and UE 115-e, do not interfere with each other, the sidelink communications can be scheduled in the same resource (e.g., in the same frequency slot). However, if the sidelink communications do interfere with each other, the sidelink communications may be schedule in different resources by base station 105-a. UEs 115 may provide the interference information to base station 105-a in the beam training report 225.

A group leader (e.g., UE 115-a), may transmit a sidelink scheduling request 210 to the base station 105-a associated with operation of the sidelink groupcast communications of the group. For example, the UE 115-a may transmit a scheduling request, a beam training request, group configuration request, and the like, to the base station 105-a. UE 115-a may transmit the sidelink scheduling request 210 in an RRC message, a MAC-CE, a scheduling request (SR), a buffer status report (BSR), or any combination thereof. The BSR may indicate an amount of data remaining in a buffer of UE 115-a for a transmission via a groupcast sidelink communication.

Responsive to the sidelink scheduling request 210, the base station 105-a may transmit a sidelink grant 215 to UEs 115 of the group. The sidelink grant 215 may provide information related to sidelink groupcast communications, such as a grant of time and frequency resources for sidelink transmissions, a grant of resources to be used for beam training, an indication of beams or resources for one or more hops, ID of UEs 115 to relay information, or any combinations thereof. UEs 115 may receive the groupcast sidelink grant 215 via RRC signaling, a MAC-CE, a DCI transmission, or any combination thereof. In some examples, the sidelink grant 215 may indicate a relay ID for UE 115-b and UE 115-d to relay groupcast sidelink message from UE 115-a to UE 115-c and UE 115-e in the second hop.

Figure 3:
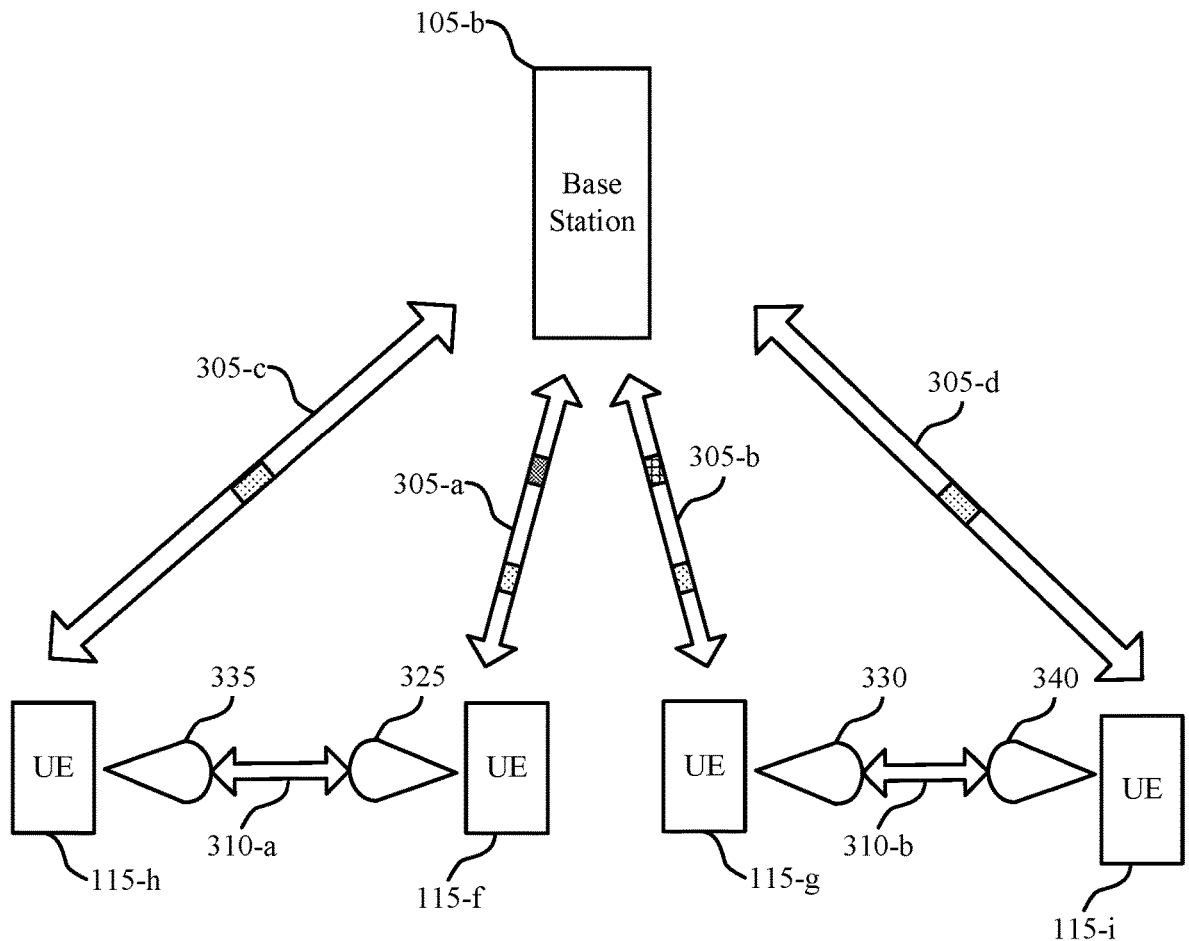
FIG. 3 illustrates an example of a wireless communications system that supports sidelink groupcast reachability based scheduling in accordance with one or more aspects of the present disclosure.

FIG. 3 illustrates an example of a wireless communications system 300 that supports sidelink groupcast reachability based scheduling in accordance with one or more aspects of the present disclosure. In some examples, wireless communications system 300 may implement aspects of wireless communications systems 100 or 200.

In some examples, the wireless communications system 300 may include a UE 115-f, a UE 115-g, a UE 115-h, a UE 115-i, and base station 105-b which may be examples of UEs 115 and base stations 105 described with reference to FIG. 1. One or more of the UEs 115 may communicate with the base station 105-b using a corresponding access link 305. In this example, the base station 105-b may communicate with UE 115-f via access link 305-a, may communicate with UE 115-g via access link 305-b, may communicate with UE 115-h via access link 205-c, and may communicate with UE 115-i via access link 205-b. In this example, UE 115-f, UE 115-g, UE 115-h, and UE 115-i may be members of a sidelink groupcast communications group, in which members of the group may communicate with other members of the group to provide data or other information via sidelinks 310.

UEs 115 may perform a beam training procedure and transmit the results in a beam training report to base station 105-b, as described herein. Base station 105-b may generate, based on the beam training report, a connectivity map of the UEs 115 indicating the interference between transmission beam and reception beams of UEs 115 in the sidelink groupcast communications group. UE 115-f may transmit a sidelink request 315-a to the base station 105-b associated with operation of the sidelink groupcast communications of the group. The groupcast sidelink request 315-a may include the UE 115-f ID, an ID associated with the sidelink group- cast communications group, the transmission beams 325 of UE 115-f, the reception beams 335 of the UE 115-h (receiving UE), and an amount of data (e.g., corresponding to a groupcast sidelink message) UE 115-f may to transmit to UE 115-h. Additionally or alternatively, UE 115-g may transmit a sidelink request 315-b to the base station 105-a. The groupcast sidelink request 315-b may include the UE 115-g ID, an ID associated with the sidelink groupcast communications group, the transmission beam 330 of UE 115-g, the reception beams 340 of the UE 115-i (receiving UE), and an amount of data UE 115-g may to transmit to UE 115-i.

Responsive to the sidelink requests 315-a and 315-b, base station 105-b may determine, based on a beam training report from UEs 115, the time and frequency resources for the UEs 115 to communicate over sidelink transmissions. The base station 105-a may transmit a sidelink grant 320 to UEs 115 of the group. The sidelink grant 320 may provide information related to sidelink groupcast communications, such as a grant of resources for sidelink transmissions, a grant of resources to be used for beam training, an indication of the transmission beams 325 and 330 and reception beams 335 and 340, resources for one or more hops, or any combinations thereof. The sidelink grant 320 may be transmitted via RRC signaling, a MAC-CE, a DCI transmission, or any combination thereof. In some examples, after determining the connectivity map, base station 105-b may schedule the transmissions over sidelink 310-a and 310-b in the same resources. Base station 105-b may determine the transmissions may not cause interference with each other based on the connectivity map. UE 115-f may use transmit beam 325 to send a groupcast sidelink message over sidelink 310-a to the reception beam 335 of UE 115-h. UE 115-g may use transmit beam 330 to send a groupcast sidelink message over sidelink 310-b to the reception beam 340 of UE 115-i.

Figure 4:
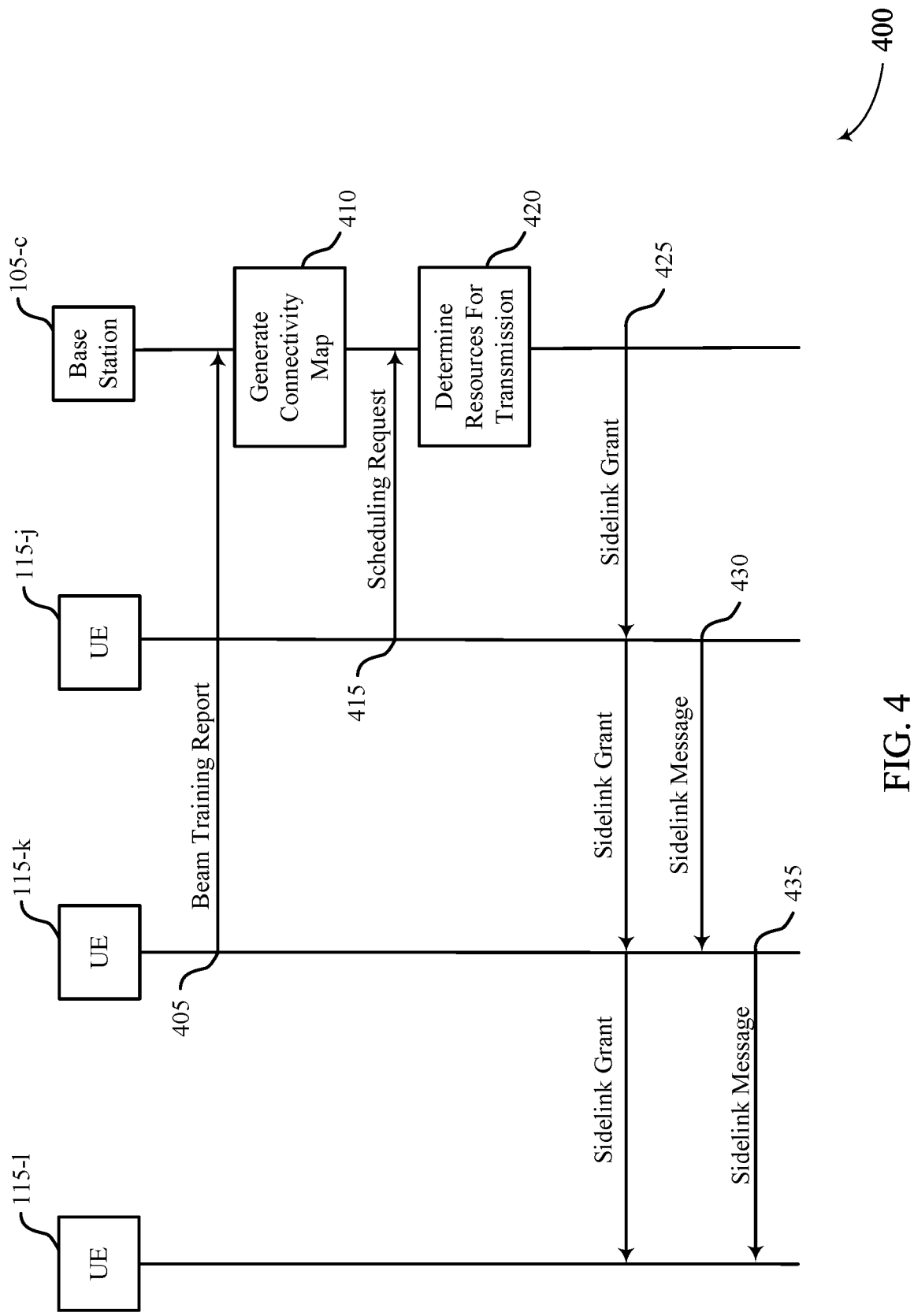
FIG. 4 illustrates an example of a process flow that supports sidelink groupcast reachability based scheduling in accordance with one or more aspects of the present disclosure.

FIG. 4 illustrates an example of a process flow 400 that supports sidelink groupcast reachability based scheduling in accordance with one or more aspects of the present disclosure. In some examples, process flow 400 may implement aspects of wireless communications systems 100, 200, or 300.

At 405, UE 115-k may transmit a beam training report to base station 105-c based on a beam training procedure between two or more UEs of a group of UEs (e.g., UE 115-k, UE 115-j, and UE 115-l) supported by base station 105-c. Additionally or alternatively, UE 115-j and UE 115-l may transmit a beam training report to base station 105-c. The beam training report may indicate one or more of a resource in which a training signal was transmitted, identifications of one or more training beams, a received signal quality of a training signal received at UE 115-k (e.g., relay UE), beams used at UE 115-k to receive the training signal, a resource in which the training signal was received, a subset of UEs including UE 115-l that are reachable by UE 115-k, or any combination thereof.

Base station 105-c may determine, based on the beam training report, a first transmit beam for UE 115-j to use for transmission of the groupcast sidelink message to UE 115-k and a second transmit beam for UE 115-k to use for transmission of the groupcast sidelink message to UE 115-l. In some examples, base station 105-c may determine, based on the beam training report, a first receive beam for UE 115-k to use for reception of the groupcast sidelink message from UE 115-j and a second receive beam for UE 115-l to use for reception of the groupcast sidelink message from UE 115-k. The first transmit and receive beams may be specific to a first hop of a multi-hop transmission of the groupcast sidelink message and the second transmit and receive beams may be specific to a second hop of the multi-hop transmission of the groupcast sidelink message.

At 410, base station 105-c may generate a connectivity map associated with the group of UEs based on the beam training report, indicating the link quality between two or more UEs of the group of UEs. The connectivity map may indicate transmit beam and receive beam link quality between the two or more UEs.

At 415, base station 105-c may receive, from UE 115-j of the group of UEs supported by base station 105-c, a sidelink scheduling request for groupcast communications between the UE 115-j and the group of UEs. The sidelink scheduling request may include a group identifier associated with the group of UEs, an identifier of UE 115-j, one or more transmission beams for the groupcast sidelink message, respective identifiers for each UE of the group of UEs, an amount of data corresponding to the groupcast sidelink message, or any combination thereof.

At 420, base station 105-c may determine, based on a beam training report associated with a beam training procedure between the first UE and one or more other UEs of the group of UEs or the connectivity map, first time resources for transmission of a groupcast sidelink message from UE 115-j to a UE 115-k (e.g., relay UE) of the group of UEs and second time resources for transmission of the groupcast sidelink message from the relay UE 115-k to UE 115-l of the group of UEs, where a group of UEs includes one or more UEs. The first time resources may be associated with a first hop of a multi-hop transmission of the groupcast sidelink message and the second time resources are associated with a second hop of the multi-hop transmission of the groupcast sidelink message.

At 425, base station 105-c may transmit, to UE 115-j, UE 115-k, and UE 115-l, a groupcast sidelink grant indicating the first and second time resources. UE 115-k may determine a receive beam for reception and a transmit beam for transmission of the groupcast sidelink message from UE 115-j based on the groupcast sidelink grant, monitor the first time resources for the groupcast sidelink message using the receive beam, and transmit, via the second time resources, the groupcast sidelink message using the transmit beam. UE 115-j, UE 115-k, and UE 115-l may receive the groupcast sidelink grant via RRC signaling, MAC-CE, a DCI transmission, or any combination thereof. The sidelink grant may indicate a relay identifier of the relay UE 115-k, respective receive identifiers for one or more receive UEs including UE 115-l, a hop number or identifier for transmission of the groupcast sidelink message by relay UE 115-k, a transmission beam for transmission of the groupcast sidelink message by UE 115-j or relay UE 115-k, or any combination thereof.

At 430, UE 115-k may receive the groupcast sidelink message from the UE 115-j via the first time resources.

At 435, UE 115-k may transmit the groupcast sidelink message received from UE 115-j to UE 115-l via the second time resources.

Figure 5:
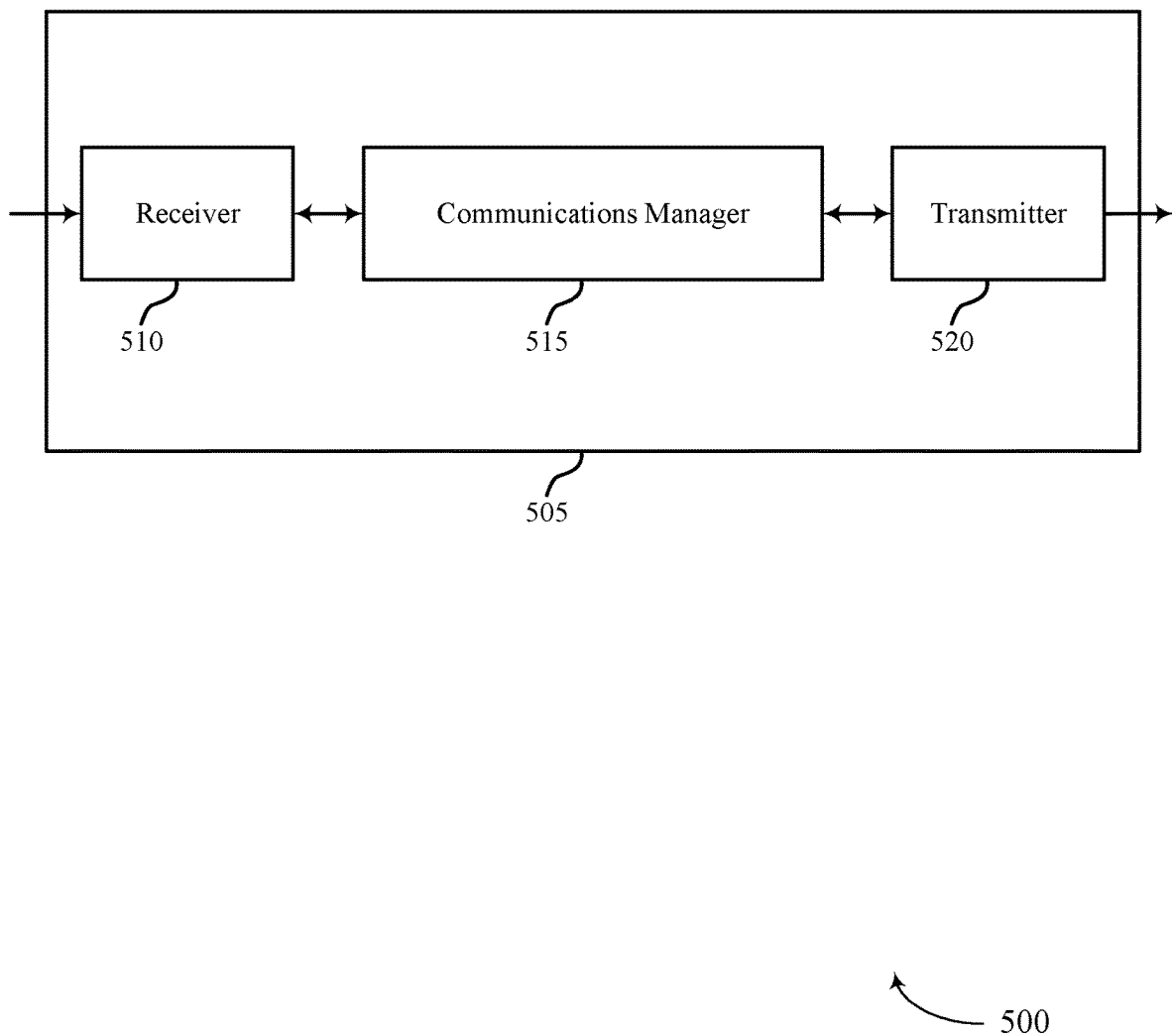
FIGS. 5 and 6 show block diagrams of devices that support sidelink groupcast reachability based scheduling in accordance with one or more aspects of the present disclosure.

FIG. 5 shows a block diagram 500 of a device 505 that supports sidelink groupcast reachability based scheduling in accordance with one or more aspects of the present disclosure. The device 505 may be an example of aspects of a UE 115 as described herein. The device 505 may include a receiver 510, a communications manager 515, and a transmitter 520. The device 505 may also include a processor. Each of these components may be in communication with one another (e.g., via one or more buses).

The receiver 510 may receive information such as packets, user data, or control information associated with various information channels (e.g., control channels, data channels, and information related to sidelink groupcast reachability based scheduling). Information may be passed on to other components of the device 505. The receiver 510 may be an example of aspects of the transceiver 820 described with reference to FIG. 8. The receiver 510 may utilize a single antenna or a set of antennas.

The communications manager 515 may transmit a beam training report to a base station based on a beam training procedure between two or more UEs of a group of UEs supported by the base station, receive, from the base station, a groupcast sidelink grant based on the beam training report, the groupcast sidelink grant indicating first time resources for transmission of a groupcast sidelink message from a first UE to the second UE and second time resources for transmission of the groupcast sidelink message from the second UE to a third UE, receive the groupcast sidelink message from the first UE via the first time resources, and transmit the groupcast sidelink message received from the first UE to the third UE via the second time resources. The communications manager 515 may be an example of aspects of the communications manager 810 described herein.

The communications manager 515, or its sub-components, may be implemented in hardware, code (e.g., software or firmware) executed by a processor, or any combination thereof. If implemented in code executed by a processor, the functions of the communications manager 515, or its sub-components may be executed by a general-purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described in the present disclosure.

The communications manager 515, or its sub-components, may be physically located at various positions, including being distributed such that portions of functions are implemented at different physical locations by one or more physical components. In some examples, the communications manager 515, or its sub-components, may be a separate and distinct component in accordance with various aspects of the present disclosure. In some examples, the communications manager 515, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The communications manager 515 may be an example of means for performing various aspects of sidelink groupcast reachability as described herein. The communications manager 515, or its sub-components, may be implemented in hardware (e.g., in communications management circuitry). The circuitry may comprise of processor, DSP, an ASIC, an FPGA or other programmable logic device, discrete gate or transistor logic, discrete hardware components, or any combination thereof designed to perform the functions described in the present disclosure.

In another implementation, the communications manager 515, or its sub-components, may be implemented in code (e.g., as communications management software or firmware) executed by a processor, or any combination thereof. If implemented in code executed by a processor, the functions of the communications manager 515, or its sub-components may be executed by a general-purpose processor, a DSP, an ASIC, an FPGA or other programmable logic device.

In some examples, the communication manager 515 may be configured to perform various operations (e.g., receiving, determining, performing, transmitting) using or otherwise in cooperation with the receiver 510, the transmitter 520, or both.

The transmitter 520 may transmit signals generated by other components of the device 505. In some examples, the transmitter 520 may be collocated with a receiver 510 in a transceiver module. For example, the transmitter 520 may be an example of aspects of the transceiver 820 described with reference to FIG. 8. The transmitter 520 may utilize a single antenna or a set of antennas.

In some examples, the communications manager 515 may be implemented as an integrated circuit or chipset for a mobile device modem, and the receiver 510 and transmitter 520 may be implemented as analog components (e.g., amplifiers, filters, antennas) coupled with the mobile device modem to enable wireless transmission and reception over one or more bands.

The communications manager 515 as described herein may be implemented to realize one or more potential advantages. One implementation may allow the device 505 to receive a groupcast sidelink grant. The groupcast sidelink grant may indicate time resources for transmission of a groupcast sidelink message. The indication of the time resources may increase reliability and reduce latency during sidelink communications.

Based on techniques for implementing sidelink groupcast reachability based scheduling as described herein, a processor of a UE 115 (e.g., controlling the receiver 510, the transmitter 520, or the transceiver 820 as described with reference to FIG. 8) may increase reliability and decrease signaling overhead in the communication of groupcast sidelink messages because the UE 115 may avoid going through unnecessary configuration processes during transmissions.

Figure 6:
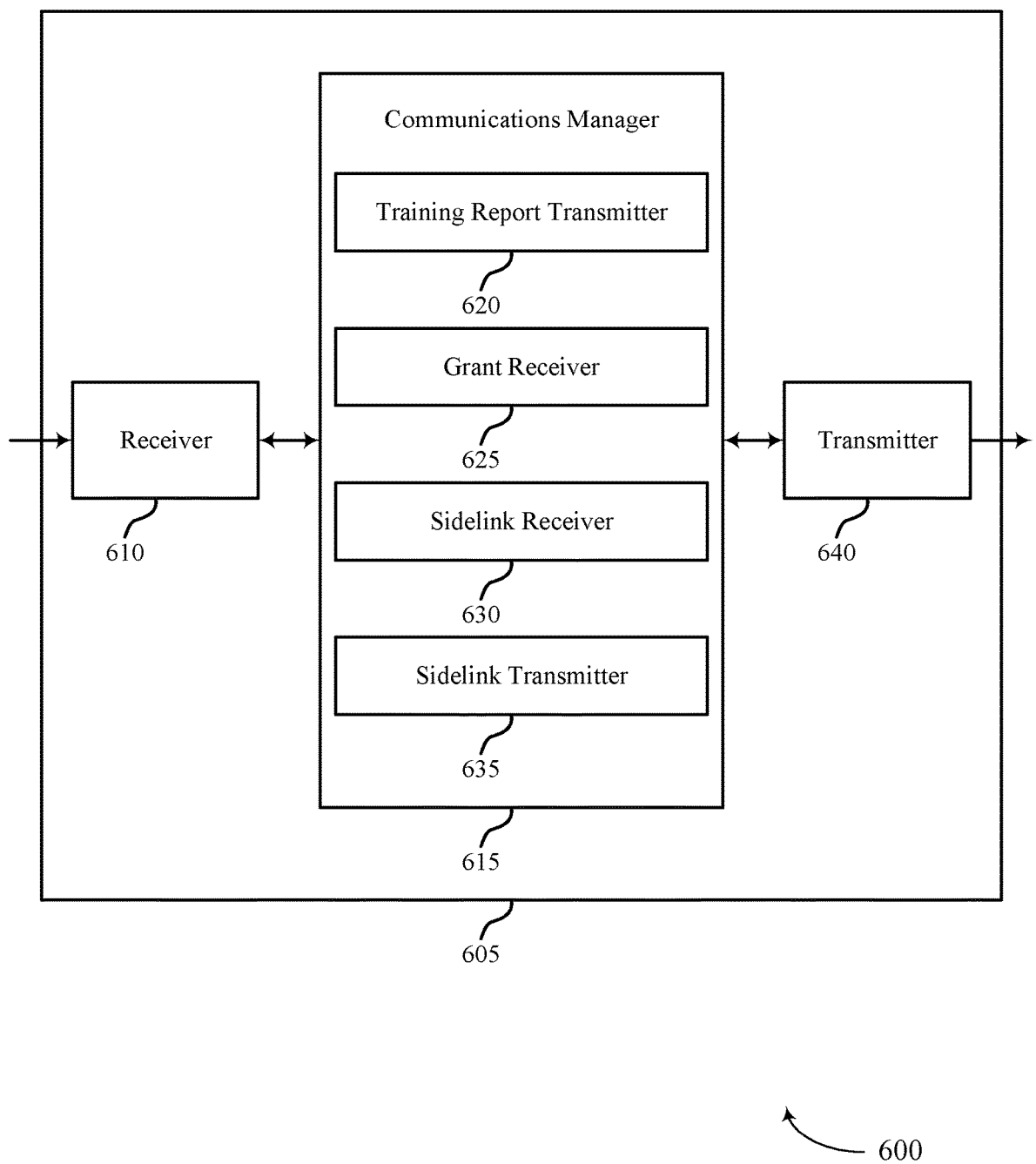

FIG. 6 shows a block diagram 600 of a device 605 that supports sidelink groupcast reachability based scheduling in accordance with one or more aspects of the present disclosure. The device 605 may be an example of aspects of a device 505, or a UE 115 as described herein. The device 605 may include a receiver 610, a communications manager 615, and a transmitter 640. The device 605 may also include a processor. Each of these components may be in communication with one another (e.g., via one or more buses).

The receiver 610 may receive information such as packets, user data, or control information associated with various information channels (e.g., control channels, data channels, and information related to sidelink groupcast reachability based scheduling). Information may be passed on to other components of the device 605. The receiver 610 may be an example of aspects of the transceiver 820 described with reference to FIG. 8. The receiver 610 may utilize a single antenna or a set of antennas.

The communications manager 615 may be an example of aspects of the communications manager 515 as described herein. The communications manager 615 may include a training report transmitter 620, a grant receiver 625, a sidelink receiver 630, and a sidelink transmitter 635. The communications manager 615 may be an example of aspects of the communications manager 810 described herein.

The training report transmitter 620 may transmit a beam training report to a base station based on a beam training procedure between two or more UEs of a group of UEs supported by the base station.

The grant receiver 625 may receive, from the base station, a groupcast sidelink grant based on the beam training report, the groupcast sidelink grant indicating first time resources for transmission of a groupcast sidelink message from a first UE to the second UE and second time resources for transmission of the groupcast sidelink message from the second UE to a third UE.

The sidelink receiver 630 may receive the groupcast sidelink message from the first UE via the first time resources.

The sidelink transmitter 635 may transmit the groupcast sidelink message received from the first UE to the third UE via the second time resources.

The transmitter 640 may transmit signals generated by other components of the device 605. In some examples, the transmitter 640 may be collocated with a receiver 610 in a transceiver module. For example, the transmitter 640 may be an example of aspects of the transceiver 820 described with reference to FIG. 8. The transmitter 640 may utilize a single antenna or a set of antennas.

In some examples, the communications manager 615 may be implemented as an integrated circuit or chipset for a mobile device modem, and the receiver 610 and transmitter 640 may be implemented as analog components (e.g., amplifiers, filters, antennas) coupled with the mobile device modem to enable wireless transmission and reception over one or more bands.

The communications manager 615 as described herein may be implemented to realize one or more potential advantages. One implementation may allow the device 605 to receive a groupcast sidelink grant. The groupcast sidelink grant may indicate time resources for transmission of a groupcast sidelink message. The indication of the time resources may increase reliability and reduce latency during sidelink communications.

Based on techniques for implementing sidelink groupcast reachability based scheduling as described herein, a processor of a UE 115 (e.g., controlling the receiver 610, the transmitter 640, or the transceiver 820 as described with reference to FIG. 8) may increase reliability and decrease signaling overhead in the communication of groupcast sidelink messages because the UE 115 may avoid going through unnecessary configuration processes during transmissions.

Figure 7:
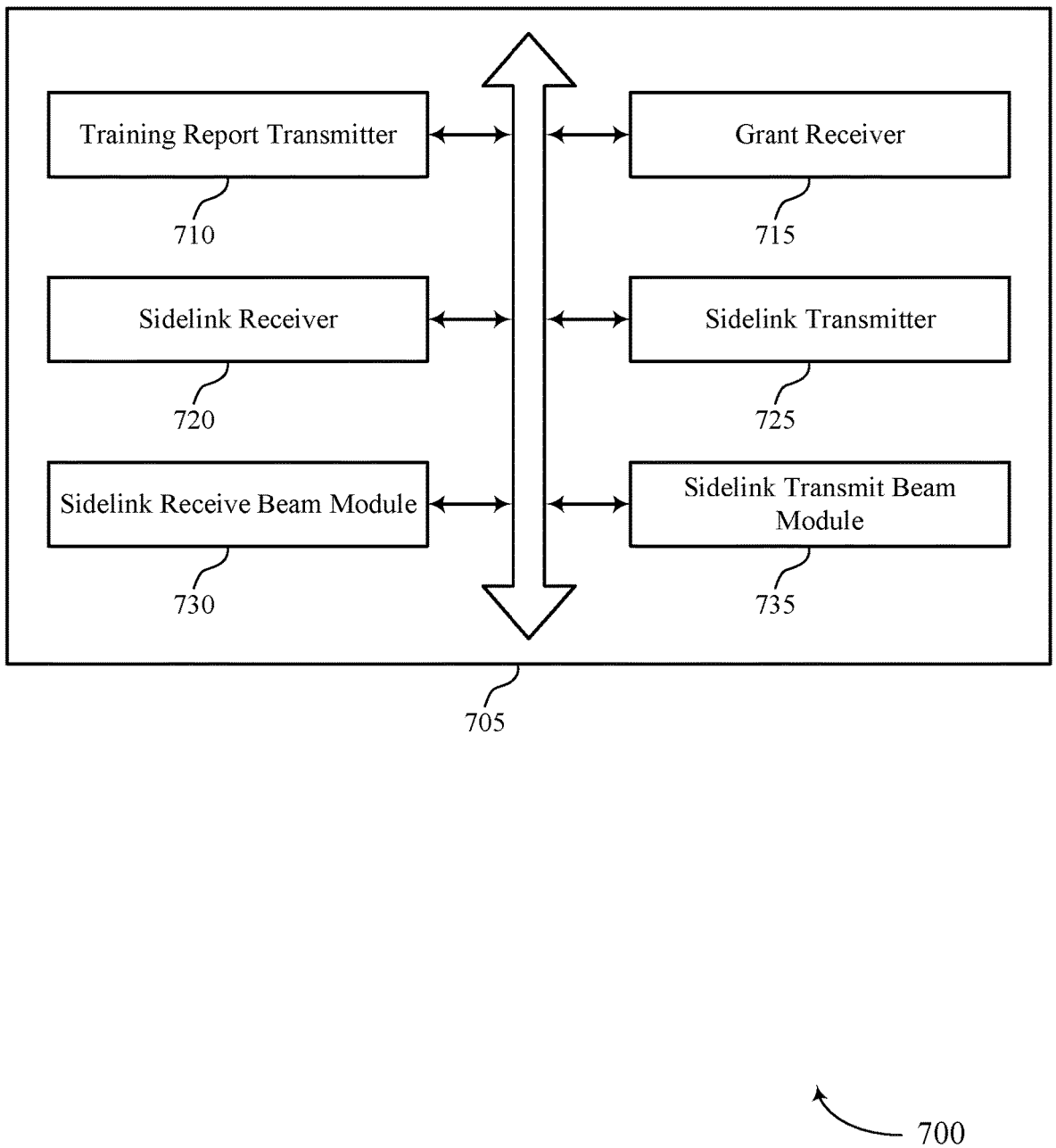
FIG. 7 shows a block diagram of a communications manager that supports sidelink groupcast reachability based scheduling in accordance with one or more aspects of the present disclosure.

FIG. 7 shows a block diagram 700 of a communications manager 705 that supports sidelink groupcast reachability based scheduling in accordance with one or more aspects of the present disclosure. The communications manager 705 may be an example of aspects of a communications manager 515, a communications manager 615, or a communications manager 810 described herein. The communications manager 705 may include a training report transmitter 710, a grant receiver 715, a sidelink receiver 720, a sidelink transmitter 725, a sidelink receive beam module 730, and a sidelink transmit beam module 735. Each of these modules may communicate, directly or indirectly, with one another (e.g., via one or more buses).

The training report transmitter 710 may transmit a beam training report to a base station based on a beam training procedure between two or more UEs of a group of UEs supported by the base station. In some cases, the beam training report indicates one or more of a resource in which a training signal was transmitted, identifications of one or more training beams, a received signal quality of a training signal received at the second UE, beams used at the second UE to receive the training signal, a resource in which the training signal was received, or any combination thereof. In some examples, the beam training report indicates a subset of UEs including the third UE that are reachable by the second UE.

The grant receiver 715 may receive, from the base station, a groupcast sidelink grant based on the beam training report, the groupcast sidelink grant indicating first time resources for transmission of a groupcast sidelink message from a first UE to the second UE and second time resources for transmission of the groupcast sidelink message from the second UE to a third UE. In some examples, the grant receiver 715 may receive the groupcast sidelink grant via RRC signaling, a MAC-CE, a DCI transmission, or any combination thereof. In some cases, the groupcast sidelink grant indicates a relay identifier of the second UE, respective receive identifiers for one or more receive UEs including the third UE, a hop number or identifier for transmission of the groupcast sidelink message by the second UE, a transmission beam for transmission of the groupcast sidelink message by the first UE or the second UE, or any combination thereof.

The sidelink receiver 720 may receive the groupcast sidelink message from the first UE via the first time resources. In some examples, the sidelink receiver 720 may monitor the first time resources for the groupcast sidelink message using the receive beam.

The sidelink transmitter 725 may transmit the groupcast sidelink message received from the first UE to the third UE via the second time resources. In some examples, the sidelink transmitter 725 may transmit, via the second time resources, the groupcast sidelink message using the transmit beam.

The sidelink receive beam module 730 may determine a receive beam for reception of the groupcast sidelink message from the first UE based on the groupcast sidelink grant.

The sidelink transmit beam module 735 may determine a transmit beam for transmission of the groupcast sidelink message to the third UE based on the groupcast sidelink grant.

Figure 8:
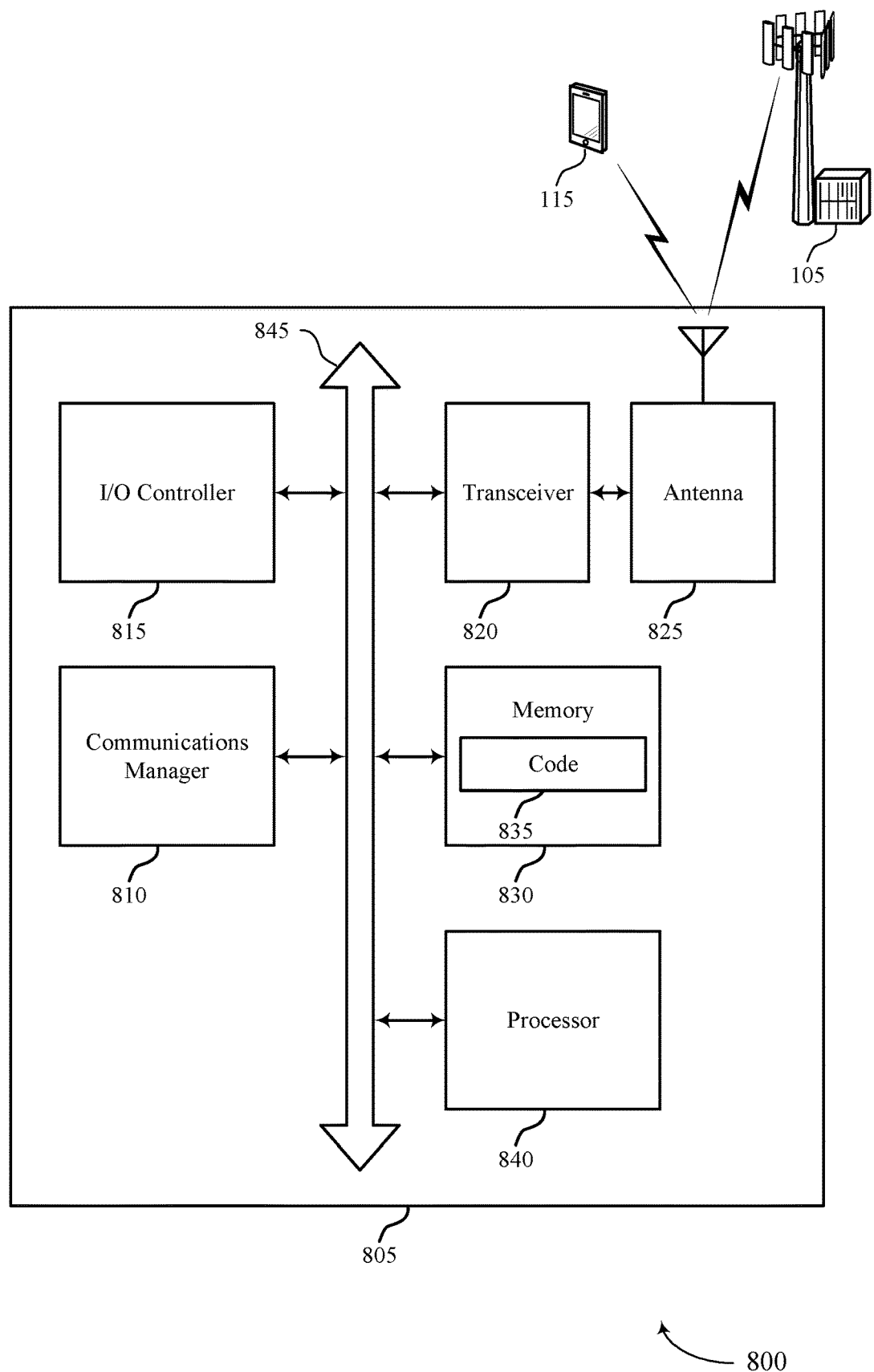
FIG. 8 shows a diagram of a system including a device that supports sidelink groupcast reachability based scheduling in accordance with one or more aspects of the present disclosure.

FIG. 8 shows a diagram of a system 800 including a device 805 that supports sidelink groupcast reachability based scheduling in accordance with one or more aspects of the present disclosure. The device 805 may be an example of or include the components of device 505, device 605, or a UE 115 as described herein. The device 805 may include components for bi-directional voice and data communications including components for transmitting and receiving communications, including a communications manager 810, an I/O controller 815, a transceiver 820, an antenna 825, memory 830, and a processor 840. These components may be in electronic communication via one or more buses (e.g., bus 845).

The communications manager 810 may transmit a beam training report to a base station based on a beam training procedure between two or more UEs of a group of UEs supported by the base station, receive, from the base station, a groupcast sidelink grant based on the beam training report, the groupcast sidelink grant indicating first time resources for transmission of a groupcast sidelink message from a first UE to the second UE and second time resources for transmission of the groupcast sidelink message from the second UE to a third UE, receive the groupcast sidelink message from the first UE via the first time resources, and transmit the groupcast sidelink message received from the first UE to the third UE via the second time resources.

The I/O controller 815 may manage input and output signals for the device 805. The I/O controller 815 may also manage peripherals not integrated into the device 805. In some cases, the I/O controller 815 may represent a physical connection or port to an external peripheral. In some cases, the I/O controller 815 may utilize an operating system such as iOS®, ANDROID®, MS-DOS®, MS-WINDOWS®, OS/2®, UNIX®, LINUX®, or another known operating system. In other cases, the I/O controller 815 may represent or interact with a modem, a keyboard, a mouse, a touch-screen, or a similar device. In some cases, the I/O controller 815 may be implemented as part of a processor. In some cases, a user may interact with the device 805 via the I/O controller 815 or via hardware components controlled by the I/O controller 815.

The transceiver 820 may communicate bi-directionally, via one or more antennas, wired, or wireless links as described herein. For example, the transceiver 820 may represent a wireless transceiver and may communicate bi-directionally with another wireless transceiver. The transceiver 820 may also include a modem to modulate the packets and provide the modulated packets to the antennas for transmission, and to demodulate packets received from the antennas.

In some cases, the device 805 may include a single antenna 825, or the device 805 may have more than one antenna 825, which may be capable of concurrently transmitting or receiving multiple wireless transmissions.

The memory 830 may include random access memory (RAM) and read only memory (ROM). The memory 830 may store computer-readable, computer-executable code 835 including instructions that, when executed, cause the processor to perform various functions described herein. In some cases, the memory 830 may contain, among other things, a basic I/O system (BIOS) which may control basic hardware or software operation such as the interaction with peripheral components or devices.

The processor 840 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 840 may be configured to operate a memory array using a memory controller. In other cases, a memory controller may be integrated into the processor 840. The processor 840 may be configured to execute computer-readable instructions stored in a memory (e.g., the memory 830) to cause the device 805 to perform various functions (e.g., functions or tasks supporting sidelink groupcast reachability based scheduling).

The code 835 may include instructions to implement aspects of the present disclosure, including instructions to support wireless communications. The code 835 may be stored in a non-transitory computer-readable medium such as system memory or other type of memory. In some cases, the code 835 may not be directly executable by the processor 840 but may cause a computer (e.g., when compiled and executed) to perform functions described herein.

Figure 9:
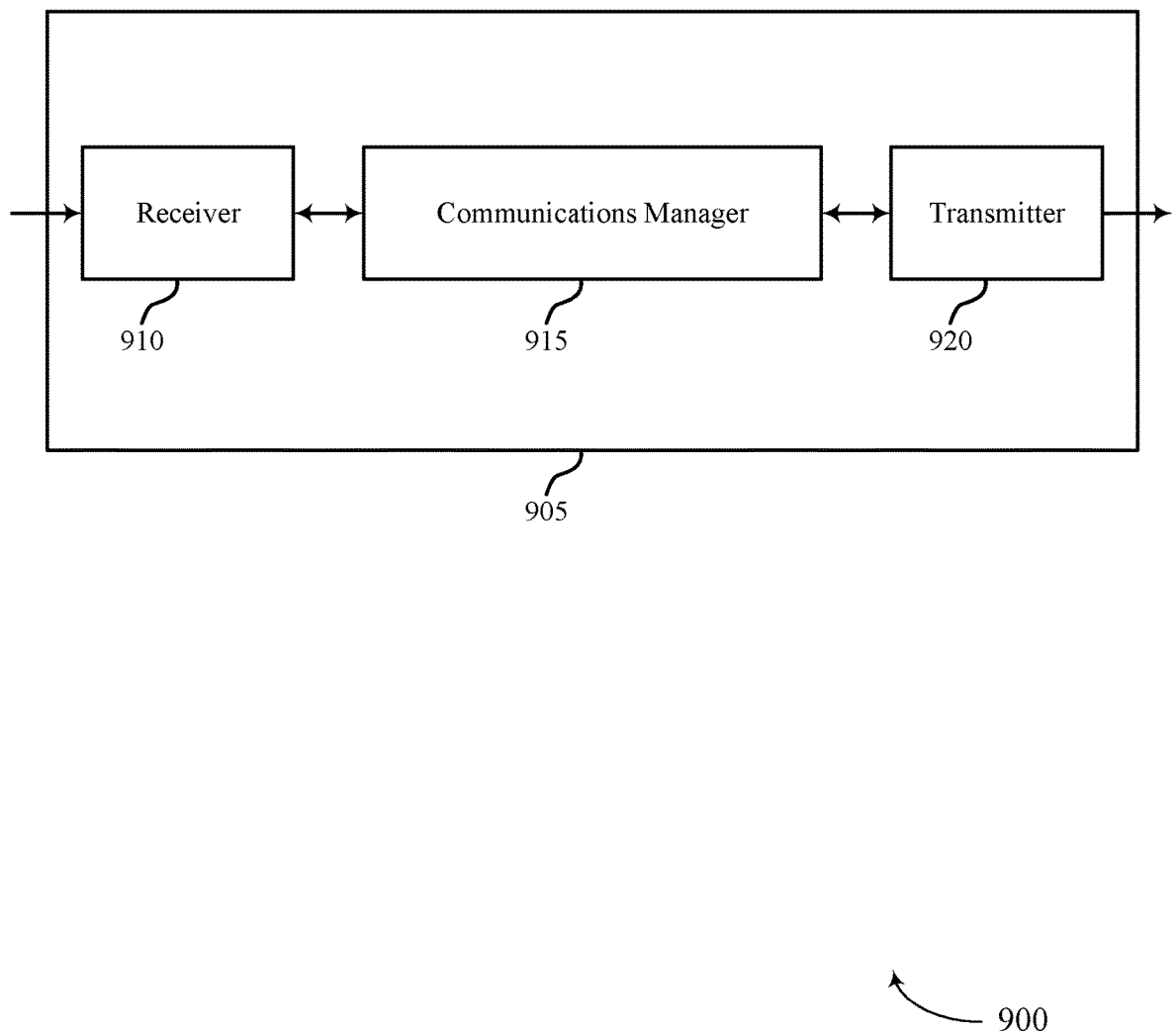
FIGS. 9 and 10 show block diagrams of devices that support sidelink groupcast reachability based scheduling in accordance with one or more aspects of the present disclosure.

FIG. 9 shows a block diagram 900 of a device 905 that supports sidelink groupcast reachability based scheduling in accordance with one or more aspects of the present disclosure. The device 905 may be an example of aspects of a base station 105 as described herein. The device 905 may include a receiver 910, a communications manager 915, and a transmitter 920. The device 905 may also include a processor. Each of these components may be in communication with one another (e.g., via one or more buses).

The receiver 910 may receive information such as packets, user data, or control information associated with various information channels (e.g., control channels, data channels, and information related to sidelink groupcast reachability based scheduling). Information may be passed on to other components of the device 905. The receiver 910 may be an example of aspects of the transceiver 1220 described with reference to FIG. 12. The receiver 910 may utilize a single antenna or a set of antennas.

The communications manager 915 may receive, from a first UE of a group of UEs supported by the base station, a sidelink scheduling request for groupcast communications between the first UE and the group of UEs, determine, based on a beam training report associated with a beam training procedure between the first UE and one or more other UEs of the group of UEs, first time resources for transmission of a groupcast sidelink message from the first UE to a second UE of the group of UEs and second time resources for transmission of the groupcast sidelink message from the second UE to a third UE of the group of UEs, and transmit a groupcast sidelink grant indicating the first and second time resources. The communications manager 915 may be an example of aspects of the communications manager 1210 described herein.

The communications manager 915, or its sub-components, may be implemented in hardware, code (e.g., software or firmware) executed by a processor, or any combination thereof. If implemented in code executed by a processor, the functions of the communications manager 915, or its sub-components may be executed by a general-purpose processor, a DSP, an ASIC, a FPGA or other programmable logic device, discrete gate or transistor logic, discrete hardware components, or any combination thereof designed to perform the functions described in the present disclosure.

The communications manager 915, or its sub-components, may be physically located at various positions, including being distributed such that portions of functions are implemented at different physical locations by one or more physical components. In some examples, the communications manager 915, or its sub-components, may be a separate and distinct component in accordance with various aspects of the present disclosure. In some examples, the communications manager 915, or its sub-components, may be combined with one or more other hardware components, including but not limited to an I/O component, a transceiver, a network server, another computing device, one or more other components described in the present disclosure, or a combination thereof in accordance with various aspects of the present disclosure.

The communications manager 915 may be an example of means for performing various aspects of sidelink groupcast reachability as described herein. The communications manager 915, or its sub-components, may be implemented in hardware (e.g., in communications management circuitry). The circuitry may comprise of processor, DSP, an ASIC, an FPGA or other programmable logic device, discrete gate or transistor logic, discrete hardware components, or any combination thereof designed to perform the functions described in the present disclosure.

In another implementation, the communications manager 915, or its sub-components, may be implemented in code (e.g., as communications management software or firmware) executed by a processor, or any combination thereof. If implemented in code executed by a processor, the functions of the communications manager 915, or its sub-components may be executed by a general-purpose processor, a DSP, an ASIC, an FPGA or other programmable logic device.

In some examples, the communication manager 915 may be configured to perform various operations (e.g., receiving, determining, performing, transmitting) using or otherwise in cooperation with the receiver 910, the transmitter 920, or both.

The transmitter 920 may transmit signals generated by other components of the device 905. In some examples, the transmitter 920 may be collocated with a receiver 910 in a transceiver module. For example, the transmitter 920 may be an example of aspects of the transceiver 1220 described with reference to FIG. 12. The transmitter 920 may utilize a single antenna or a set of antennas.

Figure 10:
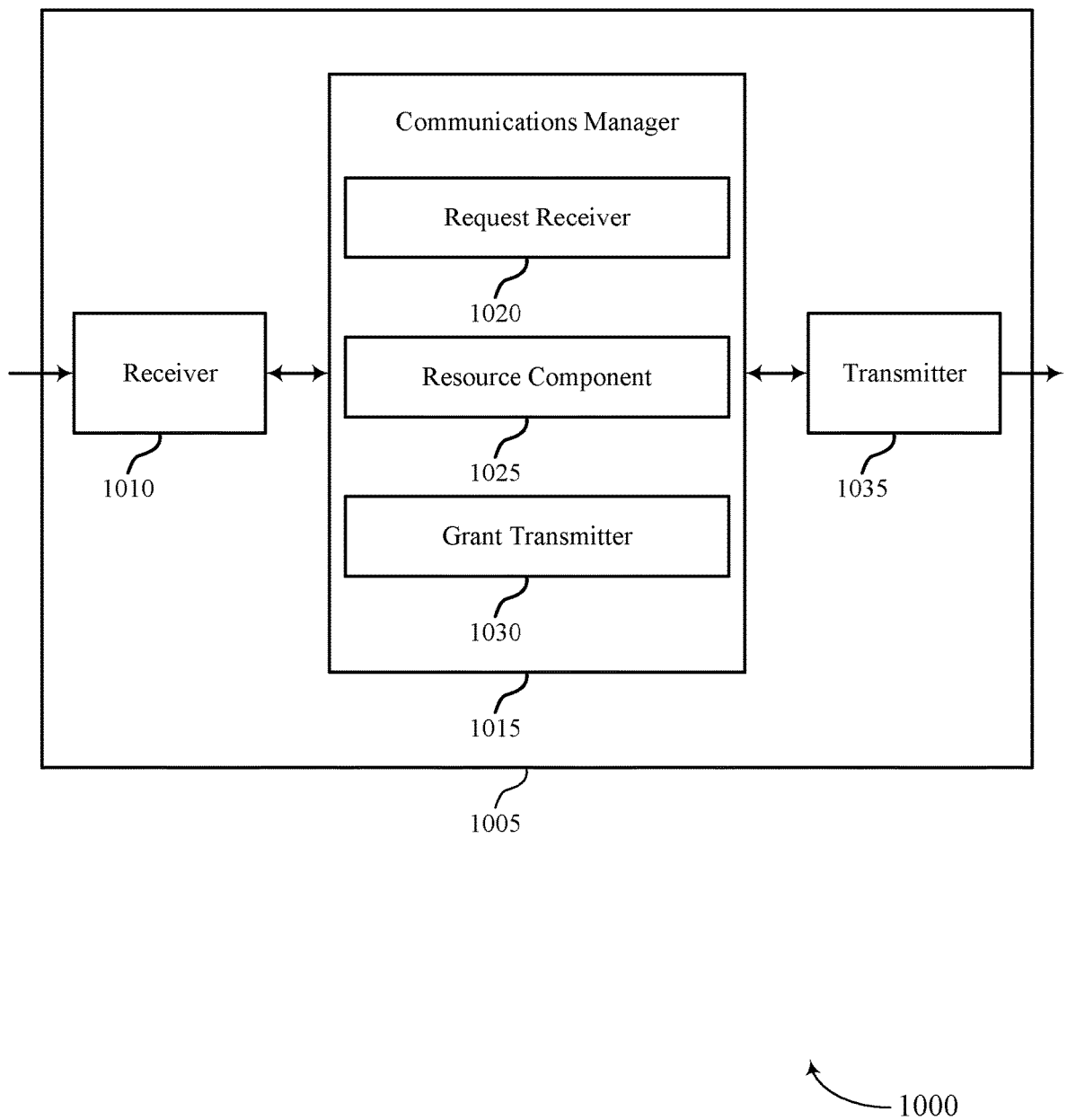

FIG. 10 shows a block diagram 1000 of a device 1005 that supports sidelink groupcast reachability based scheduling in accordance with one or more aspects of the present disclosure. The device 1005 may be an example of aspects of a device 905, or a base station 105 as described herein. The device 1005 may include a receiver 1010, a communications manager 1015, and a transmitter 1035. The device 1005 may also include a processor. Each of these components may be in communication with one another (e.g., via one or more buses).

The receiver 1010 may receive information such as packets, user data, or control information associated with various information channels (e.g., control channels, data channels, and information related to sidelink groupcast reachability based scheduling). Information may be passed on to other components of the device 1005. The receiver 1010 may be an example of aspects of the transceiver 1220 described with reference to FIG. 12. The receiver 1010 may utilize a single antenna or a set of antennas.

The communications manager 1015 may be an example of aspects of the communications manager 915 as described herein. The communications manager 1015 may include a request receiver 1020, a resource component 1025, and a grant transmitter 1030. The communications manager 1015 may be an example of aspects of the communications manager 1210 described herein.

The request receiver 1020 may receive, from a first UE of a group of UEs supported by the base station, a sidelink scheduling request for groupcast communications between the first UE and the group of UEs.

The resource component 1025 may determine, based on a beam training report associated with a beam training procedure between the first UE and one or more other UEs of the group of UEs, first time resources for transmission of a groupcast sidelink message from the first UE to a second UE of the group of UEs and second time resources for transmission of the groupcast sidelink message from the second UE to a third UE of the group of UEs.

The grant transmitter 1030 may transmit a groupcast sidelink grant indicating the first and second time resources.

The transmitter 1035 may transmit signals generated by other components of the device 1005. In some examples, the transmitter 1035 may be collocated with a receiver 1010 in a transceiver module. For example, the transmitter 1035 may be an example of aspects of the transceiver 1220 described with reference to FIG. 12. The transmitter 1035 may utilize a single antenna or a set of antennas.

Figure 11:
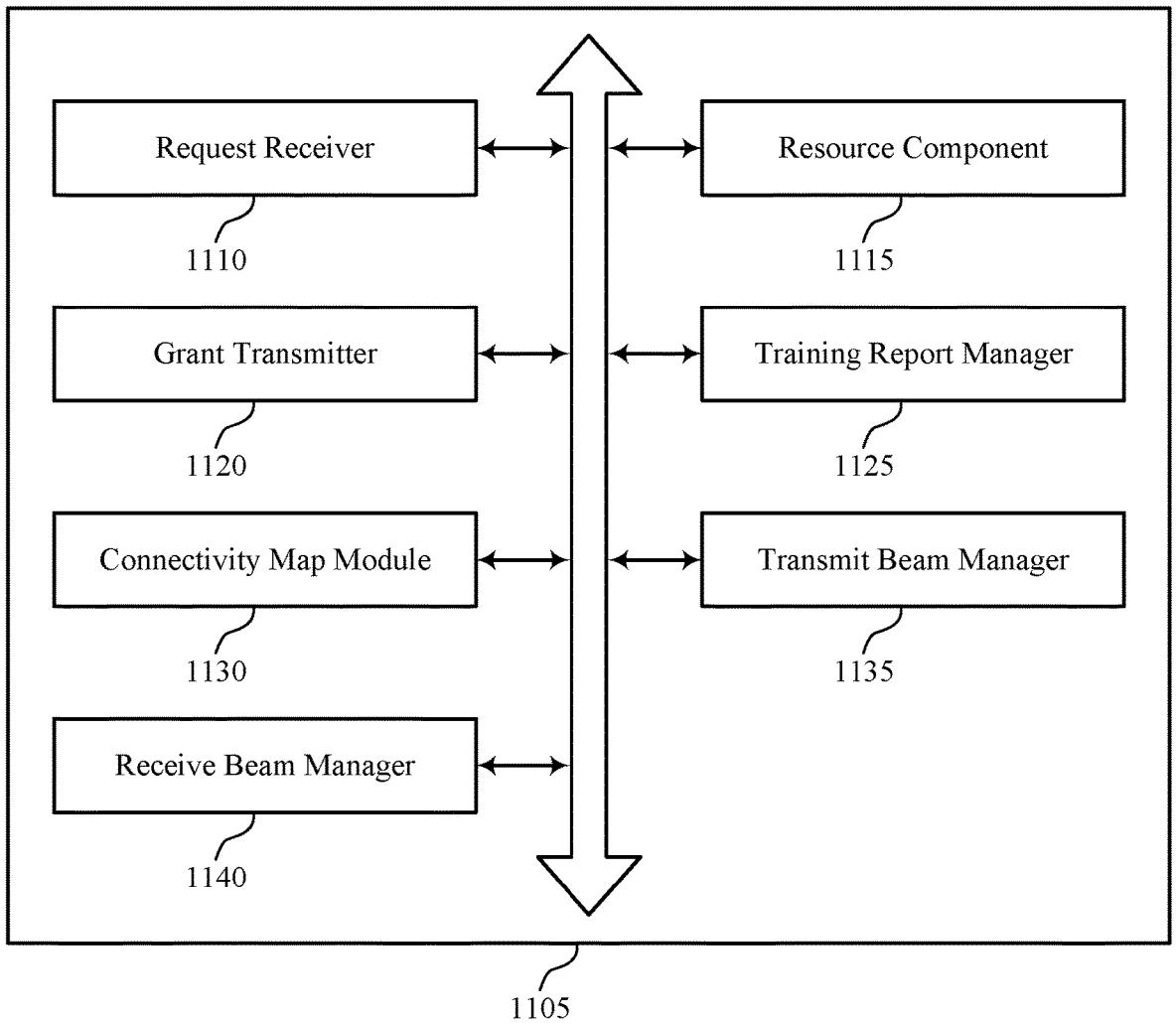
FIG. 11 shows a block diagram of a communications manager that supports sidelink groupcast reachability based scheduling in accordance with one or more aspects of the present disclosure.

FIG. 11 shows a block diagram 1100 of a communications manager 1105 that supports sidelink groupcast reachability based scheduling in accordance with one or more aspects of the present disclosure. The communications manager 1105 may be an example of aspects of a communications manager 915, a communications manager 1015, or a communications manager 1210 described herein. The communications manager 1105 may include a request receiver 1110, a resource component 1115, a grant transmitter 1120, a training report manager 1125, a connectivity map module 1130, a transmit beam manager 1135, and a receive beam manager 1140. Each of these modules may communicate, directly or indirectly, with one another (e.g., via one or more buses).

The request receiver 1110 may receive, from a first UE of a group of UEs supported by the base station, a sidelink scheduling request for groupcast communications between the first UE and the group of UEs. In some cases, the sidelink scheduling request includes a group identifier associated with the group of UEs, an identifier of the first UE, one or more transmission beams for the groupcast sidelink message, respective identifiers for each UE of the group of UEs, an amount of data corresponding to the groupcast sidelink message, or any combination thereof.

The resource component 1115 may determine, based on a beam training report associated with a beam training procedure between the first UE and one or more other UEs of the group of UEs, first time resources for transmission of a groupcast sidelink message from the first UE to a second UE of the group of UEs and second time resources for transmission of the groupcast sidelink message from the second UE to a third UE of the group of UEs. In some examples, the resource component 1115 may determine the first and second time resources based on the second beam training report. In some cases, the resource component 1115 may determine the first and second time resources based on the connectivity map. In some instances, the first time resources are associated with a first hop of a multi-hop transmission of the groupcast sidelink message. In some aspects, the second time resources are associated with a second hop of the multi-hop transmission of the groupcast sidelink message.

The grant transmitter 1120 may transmit a groupcast sidelink grant indicating the first and second time resources. In some examples, the grant transmitter 1120 may transmit the groupcast sidelink grant to the first UE, the second UE, at least one other UE, or any combination thereof. In some cases, the groupcast sidelink grant is transmitted via RRC signaling, a MAC-CE, a DCI transmission, or any combination thereof.

The training report manager 1125 may receive the beam training report from the first UE. In some examples, the training report manager 1125 may receive a second beam training report from the second UE, the second beam training report associated with a second beam training procedure between the second UE and at least one other UE. In some cases, the at least one other UE includes the first UE, the second UE, or another UE.

The connectivity map module 1130 may generate a connectivity map associated with the group of UEs based on the beam training report, where the connectivity map indicates link quality between two or more UEs of the group of UEs. In some cases, the connectivity map indicates transmit beam and receive beam link quality between the two or more UEs.

The transmit beam manager 1135 may determine a first transmit beam for the first UE to use for transmission of the groupcast sidelink message to the second UE based on the beam training report. In some examples, the transmit beam manager 1135 may determine a second transmit beam for the second UE to use for transmission of the groupcast sidelink message to the third UE based on the beam training report.

The receive beam manager 1140 may determine a first receive beam for the second UE to use for reception of the groupcast sidelink message from the first UE based on the beam training report. In some examples, the receive beam manager 1140 may determine a second receive beam for the third UE to use for reception of the groupcast sidelink message from the second UE based on the beam training report. In some cases, the first transmit and receive beams are specific to a first hop of a multi-hop transmission of the groupcast sidelink message. In some aspects, the second transmit and receive beams are specific to a second hop of the multi-hop transmission of the groupcast sidelink message.

Figure 12:
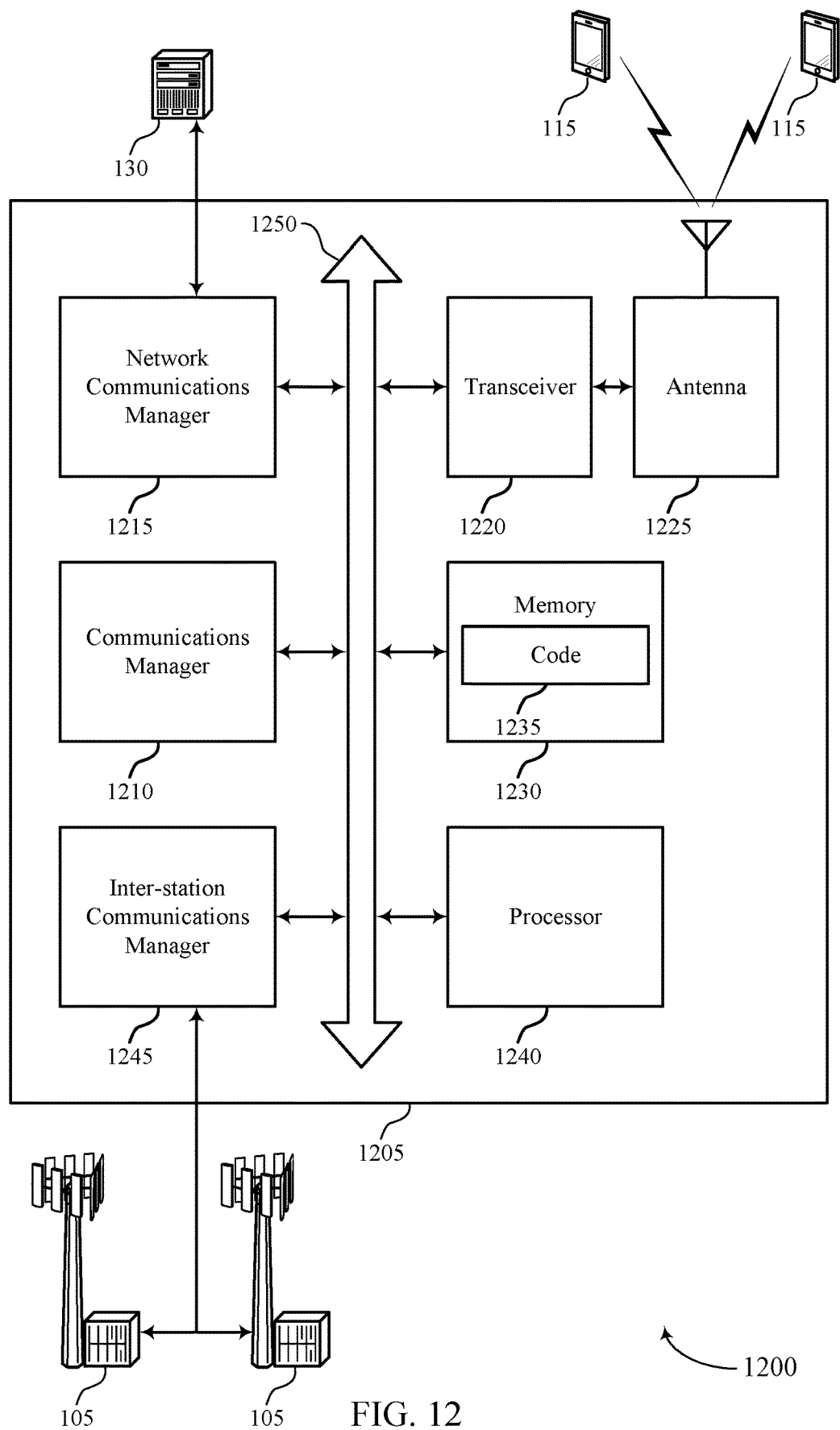
FIG. 12 shows a diagram of a system including a device that supports sidelink groupcast reachability based scheduling in accordance with one or more aspects of the present disclosure.

FIG. 12 shows a diagram of a system 1200 including a device 1205 that supports sidelink groupcast reachability based scheduling in accordance with one or more aspects of the present disclosure. The device 1205 may be an example of or include the components of device 905, device 1005, or a base station 105 as described herein. The device 1205 may include components for bi-directional voice and data communications including components for transmitting and receiving communications, including a communications manager 1210, a network communications manager 1215, a transceiver 1220, an antenna 1225, memory 1230, a processor 1240, and an inter-station communications manager 1245. These components may be in electronic communication via one or more buses (e.g., bus 1250).

The communications manager 1210 may receive, from a first UE of a group of UEs supported by the base station, a sidelink scheduling request for groupcast communications between the first UE and the group of UEs, determine, based on a beam training report associated with a beam training procedure between the first UE and one or more other UEs of the group of UEs, first time resources for transmission of a groupcast sidelink message from the first UE to a second UE of the group of UEs and second time resources for transmission of the groupcast sidelink message from the second UE to a third UE of the group of UEs, and transmit a groupcast sidelink grant indicating the first and second time resources.

The network communications manager 1215 may manage communications with the core network (e.g., via one or more wired backhaul links). For example, the network communications manager 1215 may manage the transfer of data communications for client devices, such as one or more UEs 115.

The transceiver 1220 may communicate bi-directionally, via one or more antennas, wired, or wireless links as described herein. For example, the transceiver 1220 may represent a wireless transceiver and may communicate bi-directionally with another wireless transceiver. The transceiver 1220 may also include a modem to modulate the packets and provide the modulated packets to the antennas for transmission, and to demodulate packets received from the antennas.

In some cases, the wireless device may include a single antenna 1225. However, in some cases, the device may have more than one antenna 1225, which may be capable of concurrently transmitting or receiving multiple wireless transmissions.

The memory 1230 may include RAM, ROM, or a combination thereof. The memory 1230 may store computer-readable code 1235 including instructions that, when executed by a processor (e.g., the processor 1240) cause the device to perform various functions described herein. In some cases, the memory 1230 may contain, among other things, a BIOS which may control basic hardware or software operation such as the interaction with peripheral components or devices.

The processor 1240 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some cases, a memory controller may be integrated into processor

1240. The processor 1240 may be configured to execute computer-readable instructions stored in a memory (e.g., the memory 1230) to cause the device 1205 to perform various functions (e.g., functions or tasks supporting sidelink groupcast reachability based scheduling).

The inter-station communications manager 1245 may manage communications with other base station 105, and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communication network technology to provide communication between base stations 105.

The code 1235 may include instructions to implement aspects of the present disclosure, including instructions to support wireless communications. The code 1235 may be stored in a non-transitory computer-readable medium such as system memory or other type of memory. In some cases, the code 1235 may not be directly executable by the processor 1240 but may cause a computer (e.g., when compiled and executed) to perform functions described herein.

Figure 13:
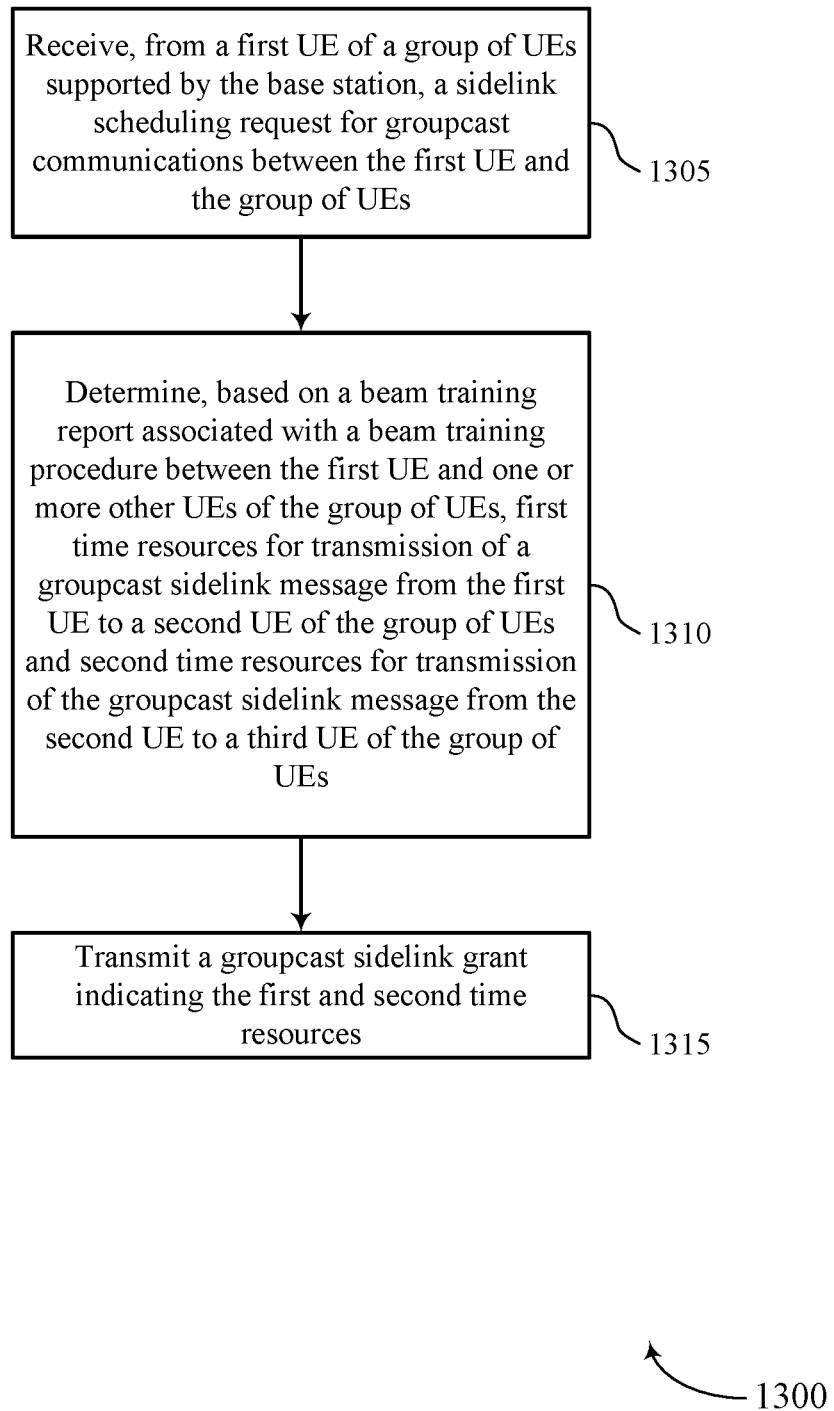
FIGS. 13 through 17 show flowcharts illustrating methods that support sidelink groupcast reachability based scheduling in accordance with one or more aspects of the present disclosure.

FIG. 13 shows a flowchart illustrating a method 1300 that supports sidelink groupcast reachability based scheduling in accordance with one or more aspects of the present disclosure. The operations of method 1300 may be implemented by a base station 105 or its components as described herein. For example, the operations of method 1300 may be performed by a communications manager as described with reference to FIGS. 9 through 12. In some examples, a base station may execute a set of instructions to control the functional elements of the base station to perform the functions described herein. Additionally or alternatively, a base station may perform aspects of the functions described herein using special-purpose hardware.

At 1305, the base station may receive, from a first UE of a group of UEs supported by the base station, a sidelink scheduling request for groupcast communications between the first UE and the group of UEs. The operations of 1305 may be performed according to the methods described herein. In some examples, aspects of the operations of 1305 may be performed by a request receiver as described with reference to FIGS. 9 through 12.

At 1310, the base station may determine, based on a beam training report associated with a beam training procedure between the first UE and one or more other UEs of the group of UEs, first time resources for transmission of a groupcast sidelink message from the first UE to a second UE of the group of UEs and second time resources for transmission of the groupcast sidelink message from the second UE to a third UE of the group of UEs. The operations of 1310 may be performed according to the methods described herein. In some examples, aspects of the operations of 1310 may be performed by a resource component as described with reference to FIGS. 9 through 12.

At 1315, the base station may transmit a groupcast sidelink grant indicating the first and second time resources. The operations of 1315 may be performed according to the methods described herein. In some examples, aspects of the operations of 1315 may be performed by a grant transmitter as described with reference to FIGS. 9 through 12.

Figure 14:
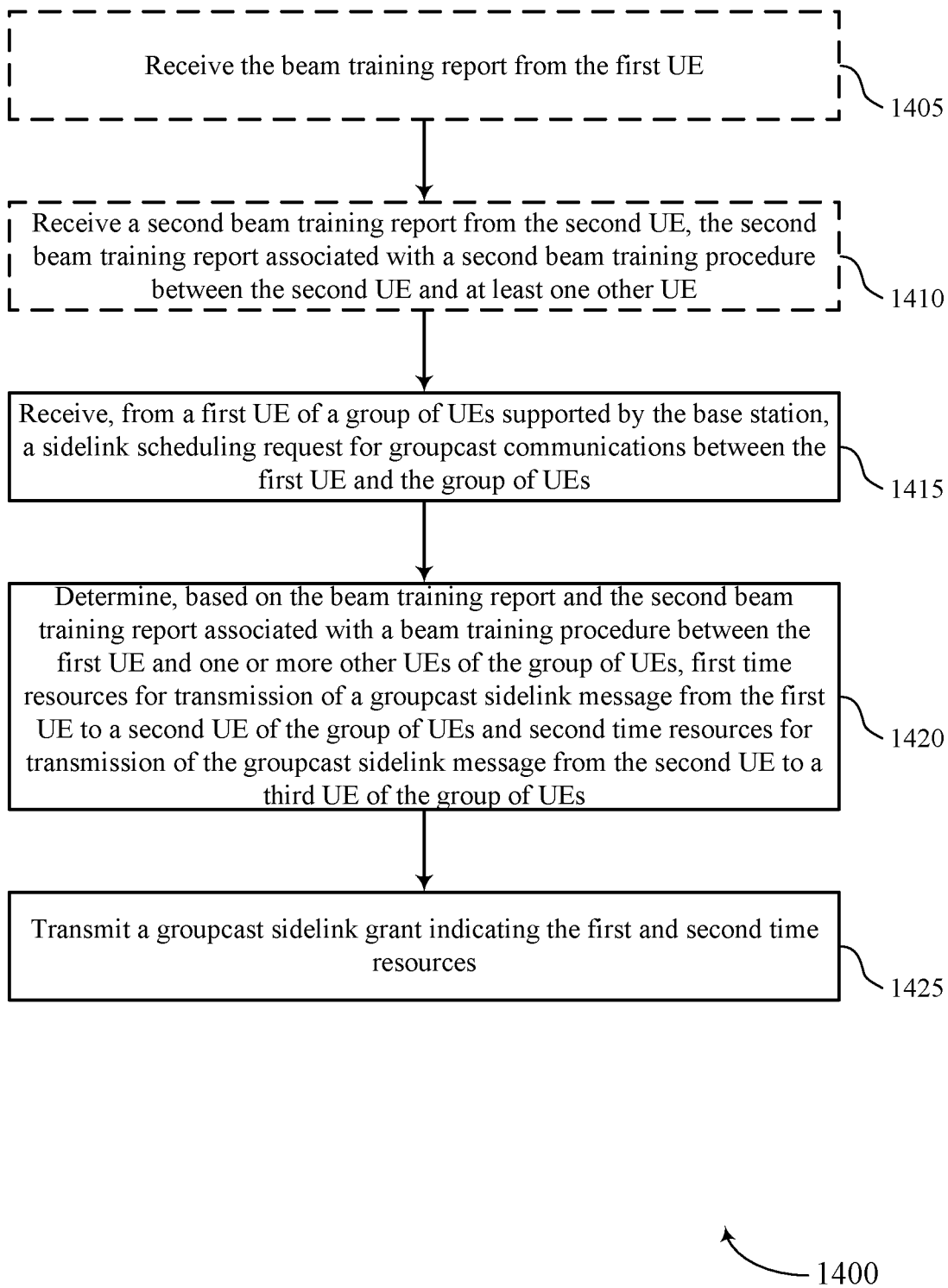

FIG. 14 shows a flowchart illustrating a method 1400 that supports sidelink groupcast reachability based scheduling in accordance with one or more aspects of the present disclosure. The operations of method 1400 may be implemented by a base station 105 or its components as described herein. For example, the operations of method 1400 may be performed by a communications manager as described with reference to FIGS. 9 through 12. In some examples, a base station may execute a set of instructions to control the functional elements of the base station to perform the functions described herein. Additionally or alternatively, a base station may perform aspects of the functions described herein using special-purpose hardware.

At 1405, the base station may receive the beam training report from the first UE. The operations of 1405 may be performed according to the methods described herein. In some examples, aspects of the operations of 1405 may be performed by a training report manager as described with reference to FIGS. 9 through 12.

At 1410, the base station may receive a second beam training report from the second UE, the second beam training report associated with a second beam training procedure between the second UE and at least one other UE. The operations of 1410 may be performed according to the methods described herein. In some examples, aspects of the operations of 1410 may be performed by a training report manager as described with reference to FIGS. 9 through 12.

At 1415, the base station may receive, from a first UE of a group of UEs supported by the base station, a sidelink scheduling request for groupcast communications between the first UE and the group of UEs. The operations of 1415 may be performed according to the methods described herein. In some examples, aspects of the operations of 1415 may be performed by a request receiver as described with reference to FIGS. 9 through 12.

At 1420, the base station may determine, based on the beam training report and the second beam training report associated with a beam training procedure between the first UE and one or more other UEs of the group of UEs, first time resources for transmission of a groupcast sidelink message from the first UE to a second UE of the group of UEs and second time resources for transmission of the groupcast sidelink message from the second UE to a third UE of the group of UEs. The operations of 1420 may be performed according to the methods described herein. In some examples, aspects of the operations of 1420 may be performed by a resource component as described with reference to FIGS. 9 through 12.

At 1425, the base station may transmit a groupcast sidelink grant indicating the first and second time resources. The operations of 1425 may be performed according to the methods described herein. In some examples, aspects of the operations of 1425 may be performed by a grant transmitter as described with reference to FIGS. 9 through 12.

Figure 15:
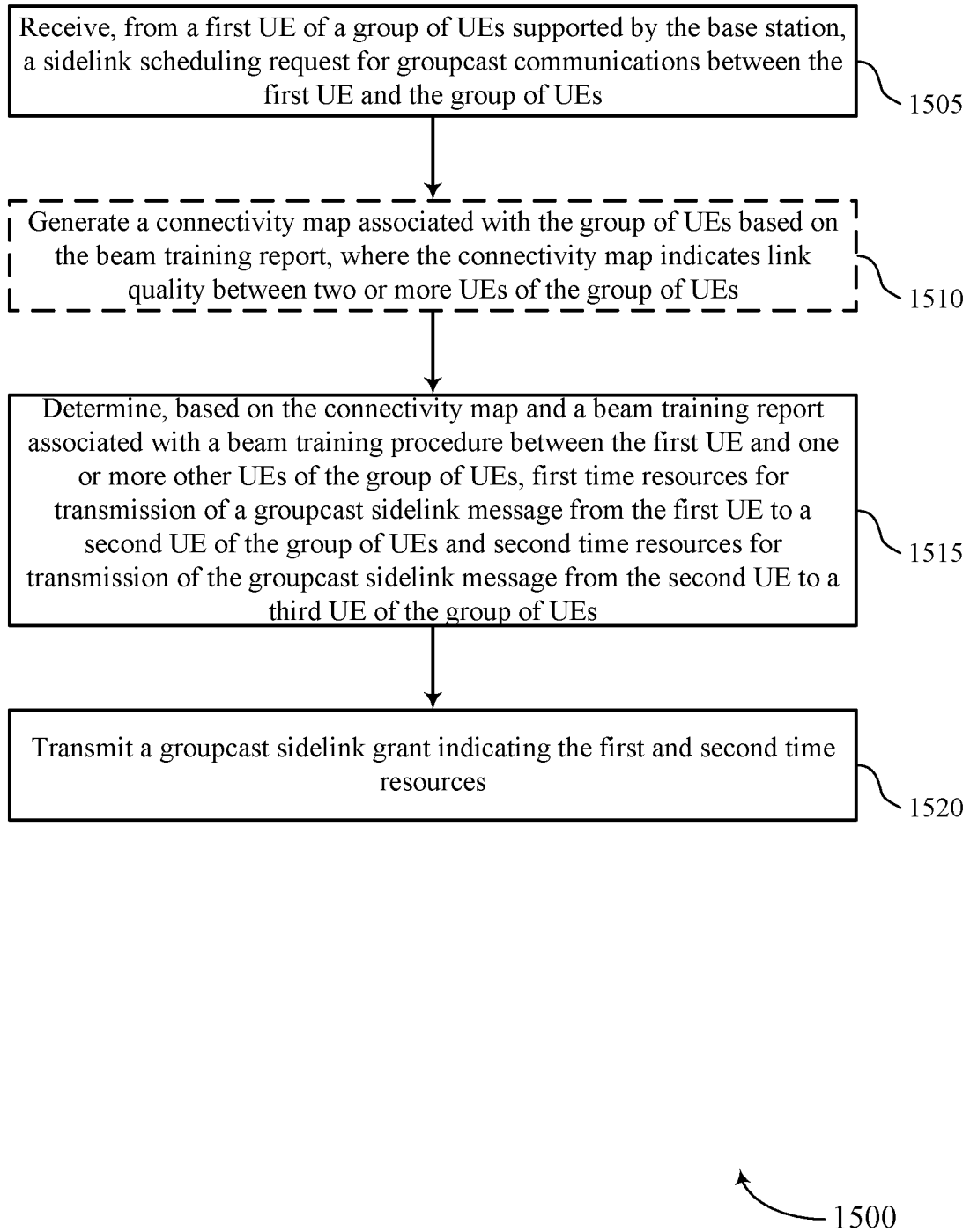

FIG. 15 shows a flowchart illustrating a method 1500 that supports sidelink groupcast reachability based scheduling in accordance with one or more aspects of the present disclosure. The operations of method 1500 may be implemented by a base station 105 or its components as described herein. For example, the operations of method 1500 may be performed by a communications manager as described with reference to FIGS. 9 through 12. In some examples, a base station may execute a set of instructions to control the functional elements of the base station to perform the functions described herein. Additionally or alternatively, a base station may perform aspects of the functions described herein using special-purpose hardware.

At 1505, the base station may receive, from a first UE of a group of UEs supported by the base station, a sidelink scheduling request for groupcast communications between the first UE and the group of UEs. The operations of 1505 may be performed according to the methods described herein. In some examples, aspects of the operations of 1505 may be performed by a request receiver as described with reference to FIGS. 9 through 12.

At 1510, the base station may generate a connectivity map associated with the group of UEs based on the beam training report, where the connectivity map indicates link quality between two or more UEs of the group of UEs. The operations of 1510 may be performed according to the methods described herein. In some examples, aspects of the operations of 1510 may be performed by a connectivity map module as described with reference to FIGS. 9 through 12.

At 1515, the base station may determine, based on the connectivity map and a beam training report associated with a beam training procedure between the first UE and one or more other UEs of the group of UEs, first time resources for transmission of a groupcast sidelink message from the first UE to a second UE of the group of UEs and second time resources for transmission of the groupcast sidelink message from the second UE to a third UE of the group of UEs. The operations of 1515 may be performed according to the methods described herein. In some examples, aspects of the operations of 1515 may be performed by a resource component as described with reference to FIGS. 9 through 12.

At 1520, the base station may transmit a groupcast sidelink grant indicating the first and second time resources. The operations of 1520 may be performed according to the methods described herein. In some examples, aspects of the operations of 1520 may be performed by a grant transmitter as described with reference to FIGS. 9 through 12.

Figure 16:
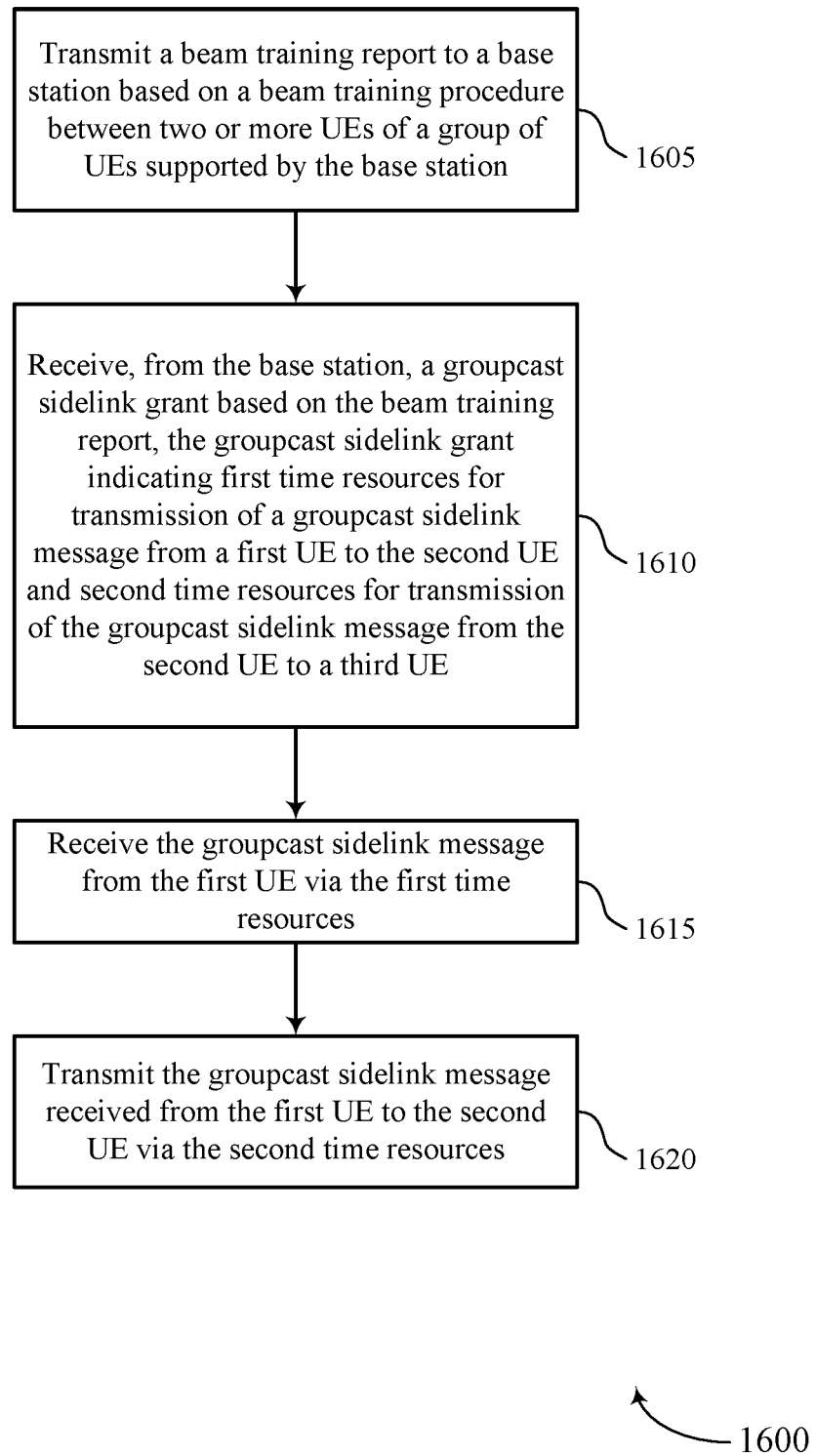

FIG. 16 shows a flowchart illustrating a method 1600 that supports sidelink groupcast reachability based scheduling in accordance with one or more aspects of the present disclosure. The operations of method 1600 may be implemented by a UE 115 or its components as described herein. For example, the operations of method 1600 may be performed by a communications manager as described with reference to FIGS. 5 through 8. In some examples, a UE may execute a set of instructions to control the functional elements of the UE to perform the functions described herein. Additionally or alternatively, a UE may perform aspects of the functions described herein using special-purpose hardware.

At 1605, the UE may transmit a beam training report to a base station based on a beam training procedure between two or more UEs of a group of UEs supported by the base station. The operations of 1605 may be performed according to the methods described herein. In some examples, aspects of the operations of 1605 may be performed by a training report transmitter as described with reference to FIGS. 5 through 8.

At 1610, the UE may receive, from the base station, a groupcast sidelink grant based on the beam training report, the groupcast sidelink grant indicating first time resources for transmission of a groupcast sidelink message from a first UE to the second UE and second time resources for transmission of the groupcast sidelink message from the second UE to a third UE. The operations of 1610 may be performed according to the methods described herein. In some examples, aspects of the operations of 1610 may be performed by a grant receiver as described with reference to FIGS. 5 through 8.

At 1615, the UE may receive the groupcast sidelink message from the first UE via the first time resources. The operations of 1615 may be performed according to the methods described herein. In some examples, aspects of the operations of 1615 may be performed by a sidelink receiver as described with reference to FIGS. 5 through 8.

At 1620, the UE may transmit the groupcast sidelink message received from the first UE to the third UE via the second time resources. The operations of 1620 may be performed according to the methods described herein. In some examples, aspects of the operations of 1620 may be performed by a sidelink transmitter as described with reference to FIGS. 5 through 8.

Figure 17:
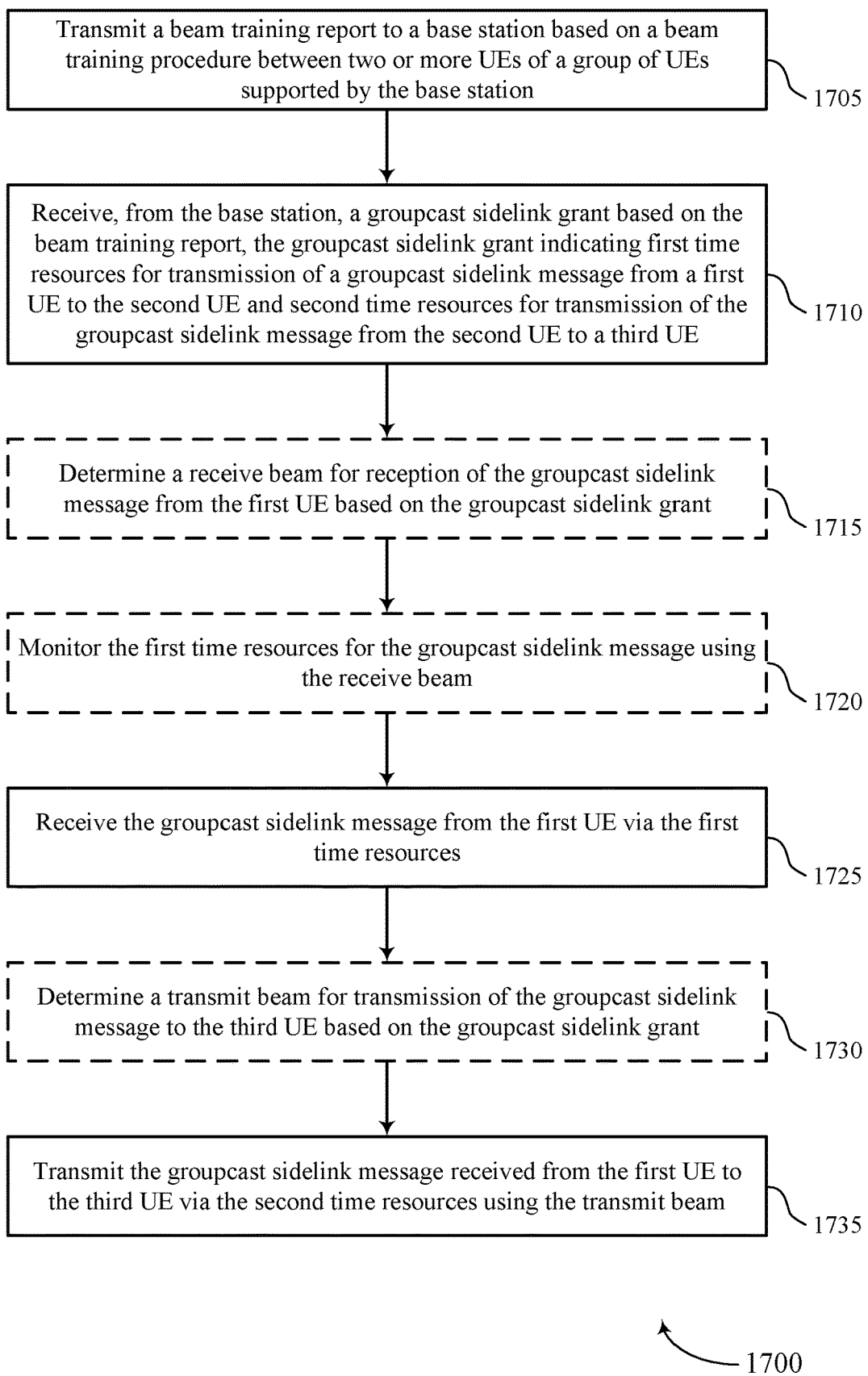

FIG. 17 shows a flowchart illustrating a method 1700 that supports sidelink groupcast reachability based scheduling in accordance with one or more aspects of the present disclosure. The operations of method 1700 may be implemented by a UE 115 or its components as described herein. For example, the operations of method 1700 may be performed by a communications manager as described with reference to FIGS. 5 through 8. In some examples, a UE may execute a set of instructions to control the functional elements of the UE to perform the functions described herein. Additionally or alternatively, a UE may perform aspects of the functions described herein using special-purpose hardware.

At 1705, the UE may transmit a beam training report to a base station based on a beam training procedure between two or more UEs of a group of UEs supported by the base station. The operations of 1705 may be performed according to the methods described herein. In some examples, aspects of the operations of 1705 may be performed by a training report transmitter as described with reference to FIGS. 5 through 8.

At 1710, the UE may receive, from the base station, a groupcast sidelink grant based on the beam training report, the groupcast sidelink grant indicating first time resources for transmission of a groupcast sidelink message from a first UE to the second UE and second time resources for transmission of the groupcast sidelink message from the second UE to a third UE. The operations of 1710 may be performed according to the methods described herein. In some examples, aspects of the operations of 1710 may be performed by a grant receiver as described with reference to FIGS. 5 through 8.

At 1715, the UE may determine a receive beam for reception of the groupcast sidelink message from the first UE based on the groupcast sidelink grant. The operations of 1715 may be performed according to the methods described herein. In some examples, aspects of the operations of 1715 may be performed by a sidelink receive beam module as described with reference to FIGS. 5 through 8.

At 1720, the UE may monitor the first time resources for the groupcast sidelink message using the receive beam. The operations of 1720 may be performed according to the methods described herein. In some examples, aspects of the operations of 1720 may be performed by a sidelink receiver as described with reference to FIGS. 5 through 8.

At 1725, the UE may receive the groupcast sidelink message from the first UE via the first time resources. The operations of 1725 may be performed according to the methods described herein. In some examples, aspects of the operations of 1725 may be performed by a sidelink receiver as described with reference to FIGS. 5 through 8.

At 1730, the UE may determine a transmit beam for transmission of the groupcast sidelink message to the third UE based on the groupcast sidelink grant. The operations of 1730 may be performed according to the methods described herein. In some examples, aspects of the operations of 1730 may be performed by a sidelink transmit beam module as described with reference to FIGS. 5 through 8.

At 1735, the UE may transmit the groupcast sidelink message received from the first UE to the third UE via the second time resources using the transmit beam. The operations of 1735 may be performed according to the methods described herein. In some examples, aspects of the operations of 1735 may be performed by a sidelink transmitter as described with reference to FIGS. 5 through 8.

Aspect 1: A method for wireless communications at a base station, comprising: receiving, from a first UE of a group of UEs supported by the base station, a sidelink scheduling request for groupcast communications between the first UE and the group of UEs, determining, based at least in part on a beam training report associated with a beam training procedure between the first UE and one or more other UEs of the group of UEs, first time resources for transmission of a groupcast sidelink message from the first UE to a second UE of the group of UEs and second time resources for transmission of the groupcast sidelink message from the second UE to a third UE of the group of UEs, and transmitting a groupcast sidelink grant indicating the first and second time resources.

Aspect 2: The method of aspect 1, further comprising: receiving the beam training report from the first UE, receiving a second beam training report from the second UE, the second beam training report associated with a second beam training procedure between the second UE and at least one other UE, and determining the first and second time resources based at least in part on the second beam training report.

Aspect 3: The method of aspect 2, wherein the at least one other UE comprises the first UE, the second UE, or another UE.

Aspect 4: The method of any one of the aspects 1 through 3, further comprising: generating a connectivity map associated with the group of UEs based at least in part on the beam training report, wherein the connectivity map indicates link quality between two or more UEs of the group of UEs, and determining the first and second time resources based at least in part on the connectivity map.

Aspect 5: The method of aspect 4, wherein the connectivity map indicates transmit beam and receive beam link quality between the two or more UEs.

Aspect 6: The method of any one of the aspects 1 through 5, wherein: the first time resources are associated with a first hop of a multi-hop transmission of the groupcast sidelink message, and the second time resources are associated with a second hop of the multi-hop transmission of the groupcast sidelink message.

Aspect 7: The method of any one of the aspects 1 through 6, further comprising: determining a first transmit beam for the first UE to use for transmission of the groupcast sidelink message to the second UE based at least in part on the beam training report, and determining a second transmit beam for the second UE to use for transmission of the groupcast sidelink message to the third UE based at least in part on the beam training report.

Aspect 8: The method of aspect 7, further comprising: determining a first receive beam for the second UE to use for reception of the groupcast sidelink message from the first UE based at least in part on the beam training report, and determining a second receive beam for the third UE to use for reception of the groupcast sidelink message from the second UE based at least in part on the beam training report.

Aspect 9: The method of aspect 8, wherein: the first transmit and receive beams are specific to a first hop of a multi-hop transmission of the groupcast sidelink message, and the second transmit and receive beams are specific to a second hop of the multi-hop transmission of the groupcast sidelink message.

Aspect 10: The method of any one of the aspect 1 through 9, further comprising: transmitting the groupcast sidelink grant to the first UE, the second UE, at least one other UE, or any combination thereof.

Aspect 11: The method of aspect 10, wherein the groupcast sidelink grant is transmitted via RRC signaling, a MAC-CE, a DCI transmission, or any combination thereof.

Aspect 12: The method of any one of the aspects 1 through 11, wherein the sidelink scheduling request comprises a group identifier associated with the group of UEs, an identifier of the first UE, one or more transmission beams for the groupcast sidelink message, respective identifiers for each UE of the group of UEs, an amount of data corresponding to the groupcast sidelink message, or any combination thereof.

Aspect 13: A method for wireless communications at a second UE, comprising: transmitting a beam training report to a base station based at least in part on a beam training procedure between two or more UEs of a group of UEs supported by the base station, receiving, from the base station, a groupcast sidelink grant based at least in part on the beam training report, the groupcast sidelink grant indicating first time resources for transmission of a groupcast sidelink message from a first UE to the second UE and second time resources for transmission of the groupcast sidelink message from the second UE to a third UE, receiving the groupcast sidelink message from the first UE via the first time resources; and transmitting the groupcast sidelink message received from the first UE to the third UE via the second time resources.

Aspect 14: The method of aspect 13, further comprising: determining a receive beam for reception of the groupcast sidelink message from the first UE based at least in part on the groupcast sidelink grant, and monitoring the first time resources for the groupcast sidelink message using the receive beam.

Aspect 15: The method of any one of the aspects 13 through 14, further comprising: determining a transmit beam for transmission of the groupcast sidelink message to the third UE based at least in part on the groupcast sidelink grant, and transmitting, via the second time resources, the groupcast sidelink message using the transmit beam.

Aspect 16: The method of any one of the aspect 13 through 15, further comprising: receiving the groupcast sidelink grant via RRC signaling, a MAC, a DCI transmission, or any combination thereof.

Aspect 17: The method of any one of the aspects 13 through 16, wherein the groupcast sidelink grant indicates a relay identifier of the second UE, respective receive identifiers for one or more receive UEs including the third UE, a hop number or identifier for transmission of the groupcast sidelink message by the second UE, a transmission beam for transmission of the groupcast sidelink message by the first UE or the second UE, or any combination thereof.

Aspect 18: The method of any one of the aspects 13 through 17, wherein the beam training report indicates one or more of a resource in which a training signal was transmitted, identifications of one or more training beams, a received signal quality of a training signal received at the second UE, beams used at the second UE to receive the training signal, a resource in which the training signal was received, or any combination thereof.

Aspect 19: The method of any of the aspects 13 through 18, wherein the beam training report indicates a subset of UEs including the third UE that are reachable by the second UE.

Aspect 20: An apparatus for wireless communication comprising at least one means for performing a method of any one of aspects 1 through 12.

Aspect 21: An apparatus for wireless communication comprising a processor and a memory coupled to the processor, the processor and memory configured to perform a method of any one of aspects 1 through 12.

Aspect 22: A non-transitory computer-readable medium storing code for wireless communication, the code comprising instructions executable by a processor to perform a method of any one of aspects 1 through 12.

Aspect 23: An apparatus for wireless communication comprising at least one means for performing a method of any one of aspects 13 through 19.

Aspect 24: An apparatus for wireless communication comprising a processor and a memory coupled to the processor, the processor and memory configured to perform a method of any one of aspects 13 through 19.

Aspect 25: A non-transitory computer-readable medium storing code for wireless communication, the code comprising instructions executable by a processor to perform a method of any one of aspects 13 through 19.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. An apparatus for wireless communication at a network device, comprising:
    one or more memories; and
    one or more processors coupled with the one or more memories and configured to cause the network device to:
        receive one or more beam training reports, each beam training report associated with a beam training procedure between two or more user equipment (UEs) of a group of UEs, the group of UEs comprising at least a first UE, a second UE, and a third UE;
        receive, from the first UE, a sidelink scheduling request for groupcast communications between the group of UEs; and
        transmit, based at least in part on the sidelink scheduling request and based at least in part on the one or more beam training reports, a groupcast sidelink grant indicative of a first resource and a second resource, the first resource allocated for transmission of a groupcast sidelink message from the first UE to the second UE and the second resource allocated for transmission of the groupcast sidelink message from the second UE to the third UE.

2. The apparatus of claim 1, wherein, to receive the one or more beam training reports, the one or more processors are configured to cause the network device to:
    receive a first beam training report from the first UE, the first beam training report associated with a first beam training procedure between the first UE and at least one UE of the group of UEs; and
    receive a second beam training report from the second UE, the second beam training report associated with a second beam training procedure between the second UE and the at least one UE of the group of UEs.

3. The apparatus of claim 1, wherein the one or more processors are further configured to cause the network device to:
    generate a connectivity map associated with the group of UEs based at least in part on the one or more beam training reports, wherein the connectivity map indicates link quality between the two or more UEs of the group of UEs, wherein transmission of the groupcast sidelink grant is based at least in part on the connectivity map.

4. The apparatus of claim 3, wherein the connectivity map indicates transmit and receive beam link quality between the two or more UEs of the group of UEs.

5. The apparatus of claim 1, wherein the one or more processors are further configured to cause the network device to:
    determine, based at least in part on the one or more beam training reports, a first transmit beam for the first UE to use for transmission of the groupcast sidelink message to the second UE; and
    determine, based at least in part on the one or more beam training reports, a second transmit beam for the second UE to use for transmission of the groupcast sidelink message to the third UE.

6. The apparatus of claim 1, wherein the one or more processors are further configured to cause the network device to:
    determine, based at least in part on the one or more beam training reports, a first receive beam for the second UE to use for reception of the groupcast sidelink message from the first UE; and
    determine, based at least in part on the one or more beam training reports, a second receive beam for the third UE to use for reception of the groupcast sidelink message from the second UE.

7. The apparatus of claim 1, wherein:
    the first resource is associated with a first hop of a multi-hop transmission of the groupcast sidelink message; and
    the second resource is associated with a second hop of the multi-hop transmission of the groupcast sidelink message.

8. The apparatus of claim 1, wherein the groupcast sidelink grant indicates a first beam and a second beam, and wherein the first beam for reception or transmission of the groupcast sidelink message between the first UE and the second UE is indicated in the groupcast sidelink grant and the second beam for reception or transmission of the groupcast sidelink message between the second UE and the third UE is indicated in the groupcast sidelink grant.

9. The apparatus of claim 1, wherein, to transmit the groupcast sidelink grant, the one or more processors are configured to cause the network device to:
    transmit the groupcast sidelink grant to the first UE, the second UE, the third UE, at least one other UE, or any combination thereof.

10. The apparatus of claim 1, wherein the groupcast sidelink grant is transmitted via a radio resource control (RRC) message, a medium access control (MAC) control element (MAC-CE), a downlink control information (DCI) transmission, or any combination thereof.

11. The apparatus of claim 1, wherein the sidelink scheduling request comprises a group identifier associated with the group of UEs, an identifier of the first UE, one or more transmission beams for the groupcast sidelink message, respective identifiers for each UE of the group of UEs, an amount of data corresponding to the groupcast sidelink message, or any combination thereof.

12. An apparatus for wireless communications at a first user equipment (UE), comprising:
    one or more memories; and
    one or more processors coupled with the one or more memories and configured to cause the first UE to:
        transmit, to a network device, a beam training report associated with two or more UEs of a group of UEs, the group of UEs comprising the first UE, a second UE, and a third UE;

transmit, to the network device, a sidelink request for groupcast communications between a the group of UEs;

receive, from the network device based at least in part on the sidelink request and based at least in part on the beam training report, a groupcast sidelink grant indicative of a first resource, the first resource for transmission of a groupcast sidelink message from the first UE to the second UE; and transmit, to the second UE, the groupcast sidelink message via the first resource.

13. The apparatus of claim 12, wherein the beam training report indicates one or more resources in which a training signal was transmitted, identifications of one or more training beams, a received signal quality of the training signal, beams used to receive the training signal, a resource in which the training signal was received, or any combination thereof.

14. The apparatus of claim 12, wherein the beam training report indicates a subset of UEs including the third UE that are detected by the second UE.

15. The apparatus of claim 12, wherein the one or more processors are further configured to cause the first UE to:
determine, based at least in part on the groupcast sidelink grant, a transmit beam for transmission of the groupcast sidelink message, wherein the groupcast sidelink message is transmitted to the second UE via the transmit beam.

16. The apparatus of claim 12, wherein the groupcast sidelink grant further indicates a second resource allocated for transmission of the groupcast sidelink message from the second UE to the third UE.

17. The apparatus of claim 12, wherein the groupcast sidelink grant indicates a relay identifier of the second UE, respective receive identifiers for one or more receive UEs including the second UE or the third UE, a hop number or identifier for transmission of the groupcast sidelink message, a transmission beam for transmission of the groupcast sidelink message, or any combination thereof.

18. An apparatus for wireless communications at a second user equipment (UE), comprising:
one or more memories; and
one or more processors coupled with the one or more memories and configured to cause the second UE to:
transmit, to a network device, a beam training report associated with two or more UEs of a group of UEs, the group of UEs comprising at least a first UE, the second UE, and a third UE;
receive, from the network device, a groupcast sidelink grant that indicates a first resource allocated for transmission of a groupcast sidelink message from the first UE to the second UE and a second resource for transmission of the groupcast sidelink message from the second UE to the third UE;
receive the groupcast sidelink message from the first UE via the first resource; and
transmit the groupcast sidelink message to the third UE via the second resource based at least in part on reception of the groupcast sidelink message from the first UE.

19. The apparatus of claim 18, wherein the beam training report indicates one or more of a resource in which a training signal was transmitted, identifications of one or more training beams, a received signal quality of the training signal received at the second UE, beams used at the second UE to receive the training signal, a resource in which the training signal was received, or any combination thereof.

20. The apparatus of claim 18, wherein the beam training report indicates a subset of UEs including the third UE that is detectable by the second UE.

21. The apparatus of claim 18, wherein the one or more processors are further configured to cause the second UE to:
determine, based at least in part on the groupcast sidelink grant, a receive beam for reception of the groupcast sidelink message from the first UE; and
monitor the first resource for the groupcast sidelink message via the receive beam.

22. The apparatus of claim 18, wherein the one or more processors are further configured to cause the second UE to:
determine, based at least in part on the groupcast sidelink grant, a transmit beam for transmission of the groupcast sidelink message to the third UE, wherein the groupcast sidelink message is transmitted to the third UE via the transmit beam.

23. The apparatus of claim 18, wherein the groupcast sidelink grant is received via a radio resource control (RRC) message, a medium access control (MAC) control element (MAC-CE), a downlink control information (DCI) transmission, or any combination thereof.

24. The apparatus of claim 18, wherein the groupcast sidelink grant indicates a relay identifier of the second UE, respective receive identifiers for one or more receive UEs including the third UE, a hop number or identifier for transmission of the groupcast sidelink message by the second UE, a transmission beam for transmission of the groupcast sidelink message, or any combination thereof.

25. A method for wireless communications at a network device, comprising:
receiving one or more beam training reports, each beam training report associated with a beam training procedure between two or more user equipment (UEs) of a group of UEs, the group of UEs comprising a first UE, a second UE, and a third UE;
receiving, from the first UE, a sidelink scheduling request for groupcast communications between the group of UEs; and
transmitting, based at least in part on the sidelink scheduling request and based at least in part on the one or more beam training reports, a groupcast sidelink grant indicative of a first resource and a second resource, the first resource allocated for transmission of a groupcast sidelink message from the first UE to the second UE and the second resource allocated for transmission of the groupcast sidelink message from the second UE to the third UE.

26. The method of claim 25, further comprising:
generating a connectivity map associated with the group of UEs based at least in part on the one or more beam training reports, wherein the connectivity map indicates link quality between the two or more UEs of the group of UEs, wherein the groupcast sidelink grant is based at least in part on the connectivity map.

27. The method of claim 25, wherein receiving the one or more beam training reports comprises:
receiving a first beam training report from the first UE, the first beam training report associated with a first beam training procedure between the first UE and at least one UE of the group of UEs; and
receiving a second beam training report from the second UE, the second beam training report associated with a second beam training procedure between the second UE and the at least one UE of the group of UEs.

28. A method for wireless communications at a first user equipment (UE), comprising:

transmitting, to a network device, a beam training report associated with two or more UEs of a group of UEs, the group of UEs comprising the first UE, a second UE, and a third UE;

transmitting, to the network device, a sidelink request for groupcast communications between the group of UEs;

receiving, from the network device based at least in part on the sidelink request and based at least in part on the beam training report, a groupcast sidelink grant indicative of a first resource, the first resource for transmission of a groupcast sidelink message from the first UE to the second UE; and transmitting, to the second UE, the groupcast sidelink message via the first resource.

29. The method of claim 28, further comprising:
determining, based at least in part on the groupcast sidelink grant, a transmit beam for transmission of the groupcast sidelink message, wherein the groupcast sidelink message is transmitted to the second UE via the transmit beam.

30. The method of claim 28, wherein the groupcast sidelink grant further indicates a second resource allocated for transmission of the groupcast sidelink message from the second UE to the third UE.

31. A method for wireless communications at a second user equipment (UE), comprising:
transmitting, to a network device, a beam training report associated with two or more UEs of a group of UEs, the group of UEs comprising at least a first UE, the second UE, and a third UE;

receiving, from the network device, a groupcast sidelink grant that indicates a first resource allocated for transmission of a groupcast sidelink message from the first UE to the second UE and a second resource for transmission of the groupcast sidelink message from the second UE to the third UE;

receiving the groupcast sidelink message from the first UE via the first resource; and transmitting the groupcast sidelink message to the third UE via the second resource based at least in part on reception of the groupcast sidelink message from the first UE.

32. The method of claim 31, further comprising:
determining, based at least in part on the groupcast sidelink grant, a receive beam for reception of the groupcast sidelink message from the first UE; and
monitoring the first resource for the groupcast sidelink message via the receive beam.

33. The method of claim 31, further comprising:
determining, based at least in part on the groupcast sidelink grant, a transmit beam for transmission of the groupcast sidelink message to the third UE, wherein the groupcast sidelink message is transmitted to the third UE via the transmit beam.

34. A non-transitory computer-readable medium storing code for wireless communication at a network device, the code comprising instructions executable by one or more processors to cause the network device to:
receive one or more beam training reports, each beam training report associated with a beam training procedure between two or more user equipment (UEs) of a group of UEs, the group of UEs comprising a first UE, a second UE, and a third UE;
receive, from the first UE, a sidelink scheduling request for groupcast communications between the group of UEs; and transmit, based at least in part on the sidelink scheduling request and based at least in part on the one or more beam training reports, a groupcast sidelink grant indicative of a first resource and a second resource, the first resource allocated for transmission of a groupcast sidelink message from the first UE to the second UE and the second resource allocated for transmission of the groupcast sidelink message from the second UE to the third UE.

35. The non-transitory computer-readable medium of claim 34, wherein the instructions are further executable by the one or more processors to cause the network device to:
generate a connectivity map associated with the group of UEs based at least in part on the one or more beam training reports, wherein the connectivity map indicates link quality between the two or more UEs of the group of UEs, wherein the groupcast sidelink grant is based at least in part on the connectivity map.

36. The non-transitory computer-readable medium of claim 34, wherein, to receive the one or more beam training reports, the instructions are executable by the one or more processors to cause the network device to:
receive a first beam training report from the first UE, the first beam training report associated with a first beam training procedure between the first UE and at least one UE of the group of UEs; and
receive a second beam training report from the second UE, the second beam training report associated with a second beam training procedure between the second UE and the at least one UE of the group of UEs.

37. A non-transitory computer-readable medium storing code for wireless communication at a first user equipment (UE), the code comprising instructions executable by one or more processors to cause the first UE to:
transmit, to a network device, a beam training report associated with two or more UEs of a group of UEs, the group of UEs comprising the first UE, a second UE, and a third UE;
transmit, to the network device, a sidelink request for groupcast communications between the group of UEs;
receive, from the network device based at least in part on the sidelink request and based at least in part on the beam training report, a groupcast sidelink grant indicative of a first resource, the first resource for transmission of a groupcast sidelink message from the first UE to the second UE; and
transmit, to the second UE, the groupcast sidelink message via the first resource.

38. The non-transitory computer-readable medium of claim 37, wherein the instructions are further executable by the one or more processors to cause the first UE to:
determine, based at least in part on the groupcast sidelink grant, a transmit beam for transmission of the groupcast sidelink message, wherein the groupcast sidelink message is transmitted to the second UE via the transmit beam.

39. The non-transitory computer-readable medium of claim 37, wherein the groupcast sidelink grant further indicates a second resource for transmission of the groupcast sidelink message from the second UE to the third UE.

40. A non-transitory computer-readable medium storing code for wireless communication at a second user equipment (UE), the code comprising instructions executable by one or more processors to cause the second UE to:

transmit, to a network device, a beam training report associated with two or more UEs of a group of UEs, the group of UEs comprising at least a first UE, the second UE, and a third UE;

receive, from the network device, a groupcast sidelink grant that indicates a first resource allocated for transmission of a groupcast sidelink message from the first UE to the second UE and a second resource for transmission of the groupcast sidelink message from the second UE to the third UE;

receive the groupcast sidelink message from the first UE via the first resource; and transmit the groupcast sidelink message to the third UE via the second resource based at least in part on reception of the groupcast sidelink message from the first UE.

41. The non-transitory computer-readable medium of claim 40, wherein the instructions are further executable by the one or more processors to cause the second UE to:

determine, based at least in part on the groupcast sidelink grant, a receive beam for reception of the groupcast sidelink message from the first UE; and monitor the first resource for the groupcast sidelink message via the receive beam.

42. The non-transitory computer-readable medium of claim 40, wherein the instructions are further executable by the one or more processors to cause the second UE to:

determine, based at least in part on the groupcast sidelink grant, a transmit beam for transmission of the groupcast sidelink message to the third UE, wherein the groupcast sidelink message is transmitted to the third UE via the transmit beam.

* * * * *